US012287068B2

(12) United States Patent
Quinn

(10) Patent No.: US 12,287,068 B2
(45) Date of Patent: Apr. 29, 2025

(54) SYSTEM AND METHOD FOR REFILLING PROPANE TANK

(71) Applicant: Enerco Group, Inc., Cleveland, OH (US)

(72) Inventor: Nickolas Quinn, North Ridgeville, OH (US)

(73) Assignee: Enerco Group, Inc., Cleveland, OH (US)

(*) Notice: Subject to any disclaimer, the term of this patent is extended or adjusted under 35 U.S.C. 154(b) by 0 days.

(21) Appl. No.: 18/684,388

(22) PCT Filed: Jun. 2, 2023

(86) PCT No.: PCT/US2023/067850
§ 371 (c)(1),
(2) Date: Feb. 16, 2024

(87) PCT Pub. No.: WO2023/235853
PCT Pub. Date: Dec. 7, 2023

(65) Prior Publication Data

US 2024/0353067 A1 Oct. 24, 2024

Related U.S. Application Data

(60) Provisional application No. 63/348,113, filed on Jun. 2, 2022.

(51) Int. Cl.
*F17C 7/02* (2006.01)

(52) U.S. Cl.
CPC ........ *F17C 7/02* (2013.01); *F17C 2201/0109* (2013.01); *F17C 2205/018* (2013.01);
(Continued)

(58) Field of Classification Search
CPC ................ F17C 7/02; F17C 2201/0109; F17C 2205/018; F17C 2205/0329;
(Continued)

(56) References Cited

U.S. PATENT DOCUMENTS

| | | |
|---|---|---|
| 4,277,950 A | 7/1981 | Eigenbrod et al. |
| 5,190,072 A | 3/1993 | McAnally |

(Continued)

FOREIGN PATENT DOCUMENTS

| | | |
|---|---|---|
| FR | 2779212 A1 | 12/1999 |
| WO | 2022047409 A1 | 3/2022 |

OTHER PUBLICATIONS

"Eco-Friendly Reusable Alernative," Flame King, [retrieved on Jan. 31, 2024], Retrieved from the Internet: <https://flameking.com/products/1lb-refillable-program-2/>.

(Continued)

*Primary Examiner* — Timothy L Maust
(74) *Attorney, Agent, or Firm* — Tucker Ellis LLP; Michael G. Craig

(57) ABSTRACT

Provided herein is a system and method for refilling refillable pressurized fluid tanks. The system includes a source tank, having a source fluid, a target refillable tank, a valve assembly, and a fill hose. The valve assembly is affixed to the refillable fluid tank and is fluidly attached to the source fluid tank with the fill hose. The fluid from the source fluid tank is transferred to the target refillable fluid tank via the fill hose and the valve assembly. When the target refillable fluid tank is filled to capacity, excess propane is dispensed from the valve assembly through an overfill valve.

20 Claims, 22 Drawing Sheets

(52) U.S. Cl.
CPC ................. *F17C 2205/0329* (2013.01); *F17C 2205/0394* (2013.01); *F17C 2221/035* (2013.01); *F17C 2265/06* (2013.01)

(58) Field of Classification Search
CPC ........ F17C 2205/0394; F17C 2221/035; F17C 2265/06
See application file for complete search history.

(56) References Cited

U.S. PATENT DOCUMENTS

| | | | | |
|---|---|---|---|---|
| 5,199,603 | A | 4/1993 | Prescott | |
| 8,381,758 | B2 | 2/2013 | Newman et al. | |
| 8,479,767 | B2 | 7/2013 | Newman et al. | |
| 9,464,760 | B2 | 10/2016 | Tsai | |
| 10,399,103 | B2 * | 9/2019 | Lamboux | B05B 11/1001 |
| 10,738,945 | B2 | 8/2020 | Tilhof | |
| 10,865,884 | B2 | 12/2020 | Newman et al. | |
| 10,914,425 | B2 * | 2/2021 | Newman | F17C 13/04 |
| 2011/0114208 | A1 | 5/2011 | Newman et al. | |
| 2012/0091380 | A1 | 4/2012 | Newman et al. | |
| 2013/0284957 | A1 | 10/2013 | Tarczewski et al. | |
| 2014/0326328 | A1 | 11/2014 | Newman | |
| 2018/0141066 | A1 | 5/2018 | Lamboux et al. | |

OTHER PUBLICATIONS

Crandall, Derrick, "Company pitches outboard powered by propane," Soundings Trade Only, [retrieved on Jan. 31, 2024], Retrieved from the Internet: <https://www.tradeonlytoday.com/dealers/company-pitches-outboard-powered-by-propane>.

The International Search Report and The Written Opinion of the International Searching Authority, or The Declaration for corresponding PCT Application No. PCT/US2023/067850, dated Sep. 19, 2023, 11 pages.

* cited by examiner

SYSTEM AND METHOD FOR REFILLING PROPANE TANK

CROSS REFERENCE TO RELATED APPLICATIONS

This application claims priority to provisional application having U.S. Ser. No. 63/348,113, entitled SYSTEM AND METHOD FOR REFILLING PROPANE TANK, filed Jun. 2, 2022, which is incorporated herein by reference.

BACKGROUND

Propane gas can be used to power various devices such as heaters, grills, generators, smokers, and the like. To power such devices, propane is often stored in, sold in, and dispensed from propane tanks of various sizes. For example, common sizes of commercial-grade propane tanks are one pound, five pound, twenty pound, and forty pound. One pound propane tanks are typically single use tanks that are thrown away or recycled after their use. Because one pound tanks are smaller and more light-weight than most other propane tank sizes, they are popular for traveling, camping, hiking, and other outdoor recreational activities.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are provided herein for the refilling and reuse of pressurized fluid tanks, such as small one-pound propane tanks. In one implementation, a system for refilling a fluid tanks includes a source fluid tank that hold the source of the fluid, such as propane, a target refillable fluid tank, such as a one-pound cylinder, and a fill valve. The source tank can be fluidly connected to the refillable tank via the fill valve such that fluid from the source tank is transferred from the source tank to the refillable tank through the fill valve.

In another implementation, a tank refilling system comprises a support foot, the support foot configured to attach to a collar of a source tank, a refillable tank comprising a valve assembly and an overpressure valve, wherein the valve assembly further comprises a fill valve and an overfill valve, and a connection system comprising a length of tubing, first connector attached to a first end of the tubing, a second connector affixed to a second end of the tubing, and a manual valve, the first connector is fluidly connected to the valve assembly of the refillable tank and the second connector is fluidly connected to the source tank, and the manual valve in fluid connection with the tubing, and wherein the first connector comprises a first prong and a second prong, the first prong and the second prong configured such that when the first connector is affixed to the valve assembly, the first prong engages with and actuates the overfill valve and the second prong engages with and actuates the fill valve.

In another implementation, the tank refilling system further comprises an overfill valve assembly, the overfill valve assembly comprising a body comprising an output, the output in fluid communication with a cavity of the refillable tank, a push button, a cam assembly, a pin configured to actuate between an opened and a closed position, the opened position configured to open the output to the cavity of the refillable tank, the closed position configured to closed the output to the cavity of the refillable tank, a spring configured to bias the pin in the closed position, wherein the push button and the cam assembly are configured to selectably translate the pin between the opened and the closed position when the push button is pressed.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
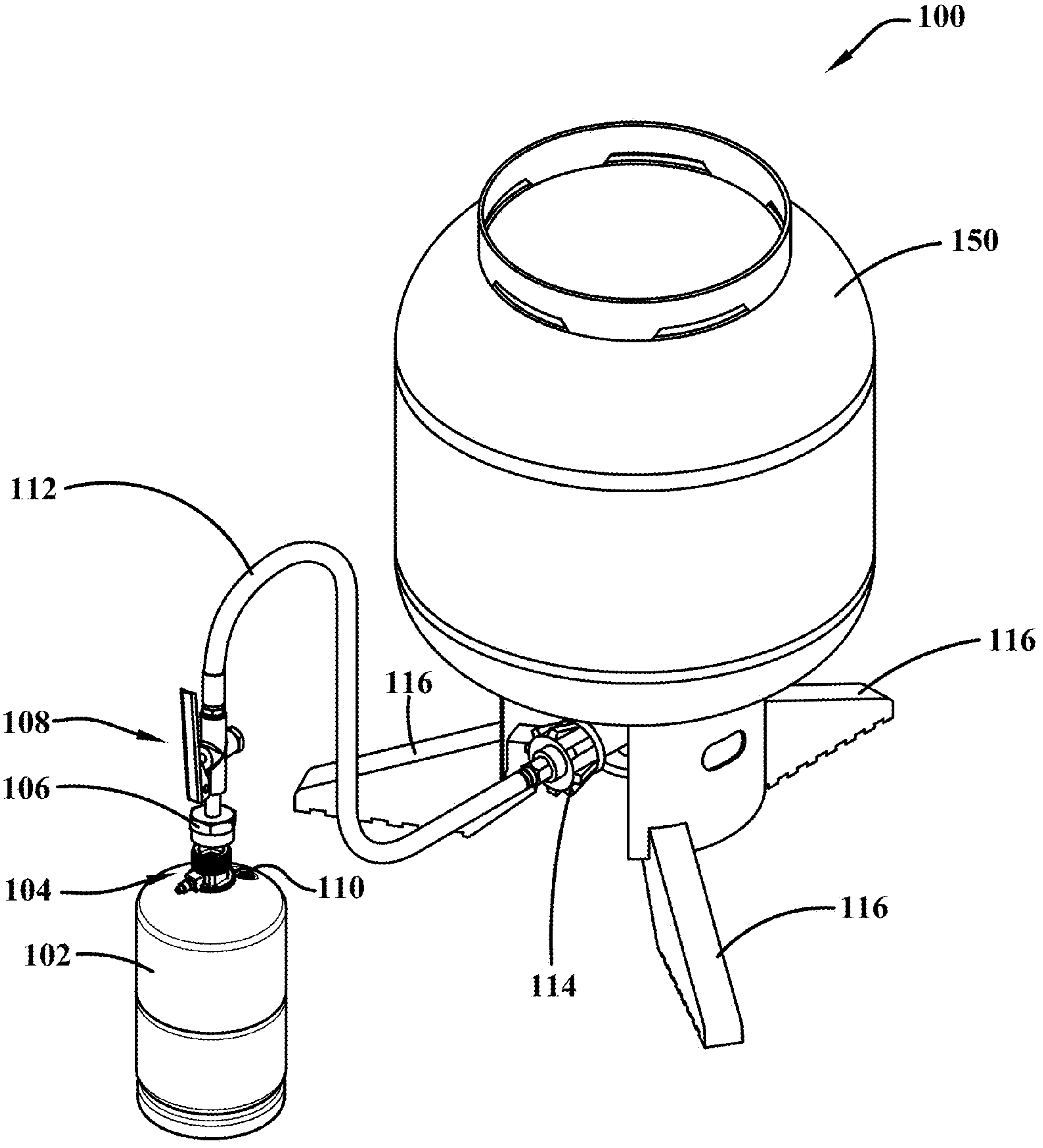
FIG. 1 is an exemplary implementation of a system for refilling a propane tank as described herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

One pound propane tanks are commonly used for outdoor recreation such as camping, hiking, fishing, or the like. The one pound tanks are popular for such uses because they are smaller, lighter, and more compact than typical twenty pound propane tanks. One pound propane tanks, however, are often single use tanks that are thrown away or recycled after every use. This may create excess waste, may be harmful to the environment, may be expensive to manufacture, and may be expensive to purchase from a consumer standpoint. A refillable propane tank system may mitigate cost, reduce tank manufacturing, reduce waste, and may reduce negative environmental effects by allowing consumers to refill their tanks rather than throwing them away. One will readily appreciate the benefits of such a system compared to the single use tanks that are commercially available.

Provided herein is a system and method for refilling a refillable propane tank with a source propane tank. By way of example, the system may be provided to refill a one pound propane tank with propane from a twenty pound propane tank.

FIG. 1 illustrates an implementation of an exemplary propane tank filling system 100. The system 100 may comprise a refillable tank 102, a valve assembly 104, a connector 106, a manual valve 108, an overpressure valve 110, a fill hose 112, a connector 114, support legs 116, and a source tank 150. The refillable tank 102 may be a one pound propane tank, and the source tank 150 may be a twenty pound propane tank. To refill the refillable tank 102, the refillable tank 102 may be fluidly connected to the source tank 150 via the fill hose 112, and propane may be transferred from the source tank 150 to the refillable tank 102.

Throughout the present application the refillable tank 102 may also be referred to as the refillable tank 102, the one pound tank 102, or simply the tank 102. It should be appreciated that the refillable tank 102 may any suitable size, such as but not limited to a one pound tank, five pound tank, ten pound tank, twenty pound tank, forty pound tank, sixty pound tank, eighty pound tank, one hundred pound tank, or any other tank size. Similarly, the source tank 150 may be referred to as a refillable twenty pound propane tank 150, or simply the tank 150. It should be appreciated that the source tank 150 may any suitable size, such as but not limited to a one pound tank, five pound tank, ten pound tank, twenty pound tank, forty pound tank, sixty pound tank, eighty pound tank, one hundred pound tank, or any other tank size. It should also be appreciated that the source tank 150 may be replaced with any other suitable propane source such.

Figure 2:
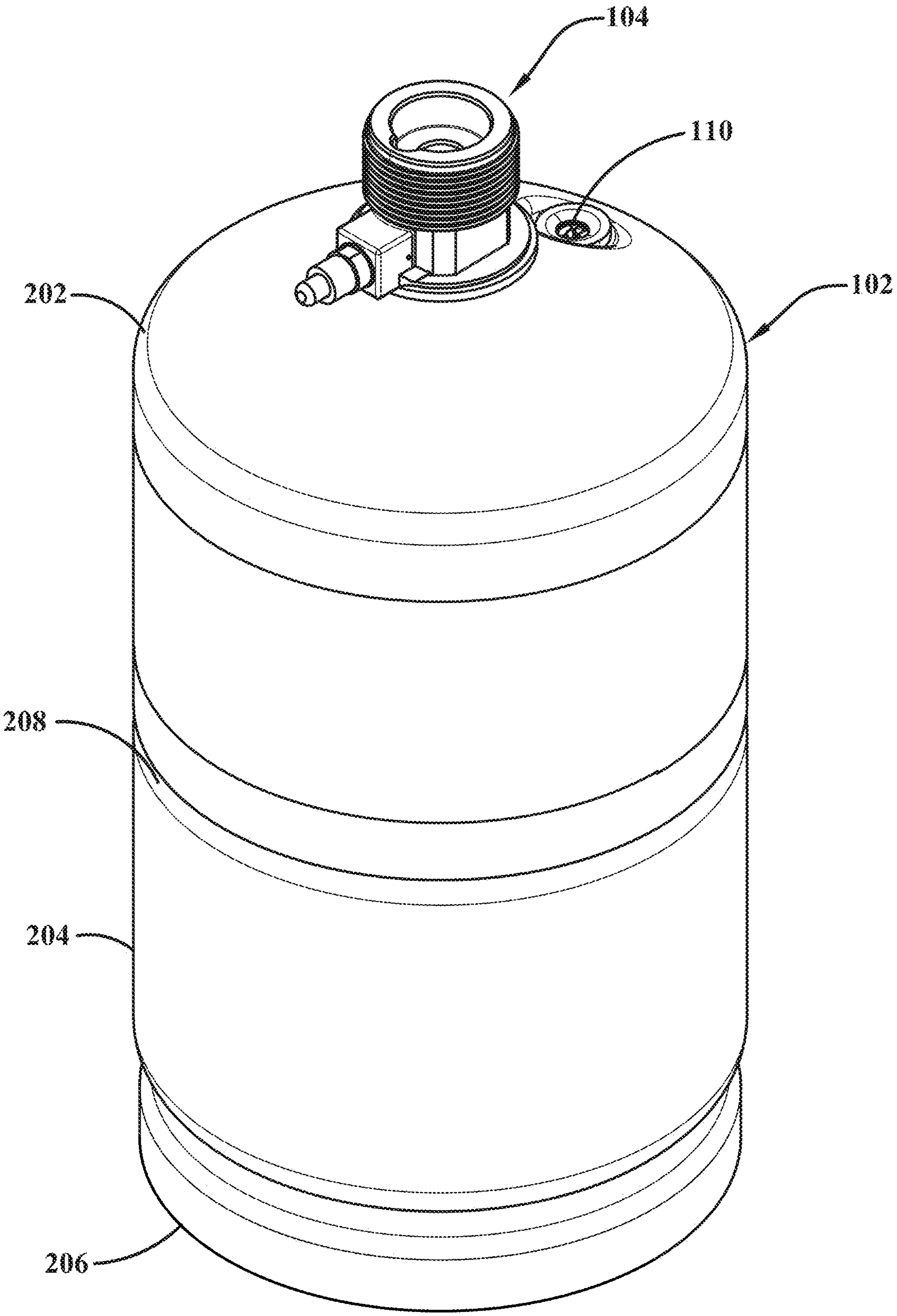
FIG. 2 is an exemplary implementation of a refillable propane tank as described herein.
Figure 3:
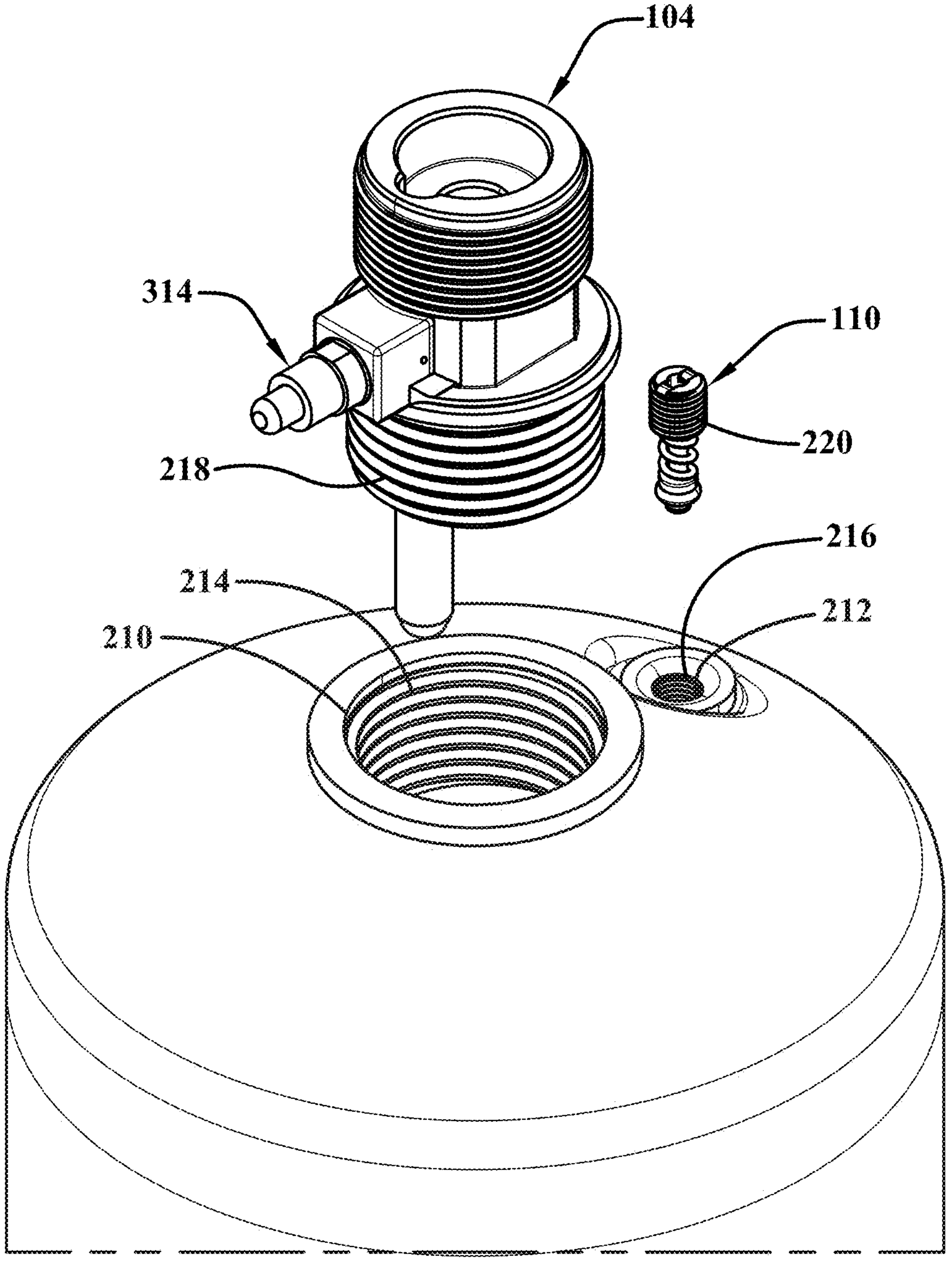
FIG. 3 is an exemplary implementation a valve assembly that may be utilized with any of the systems as described herein.
Figure 4:
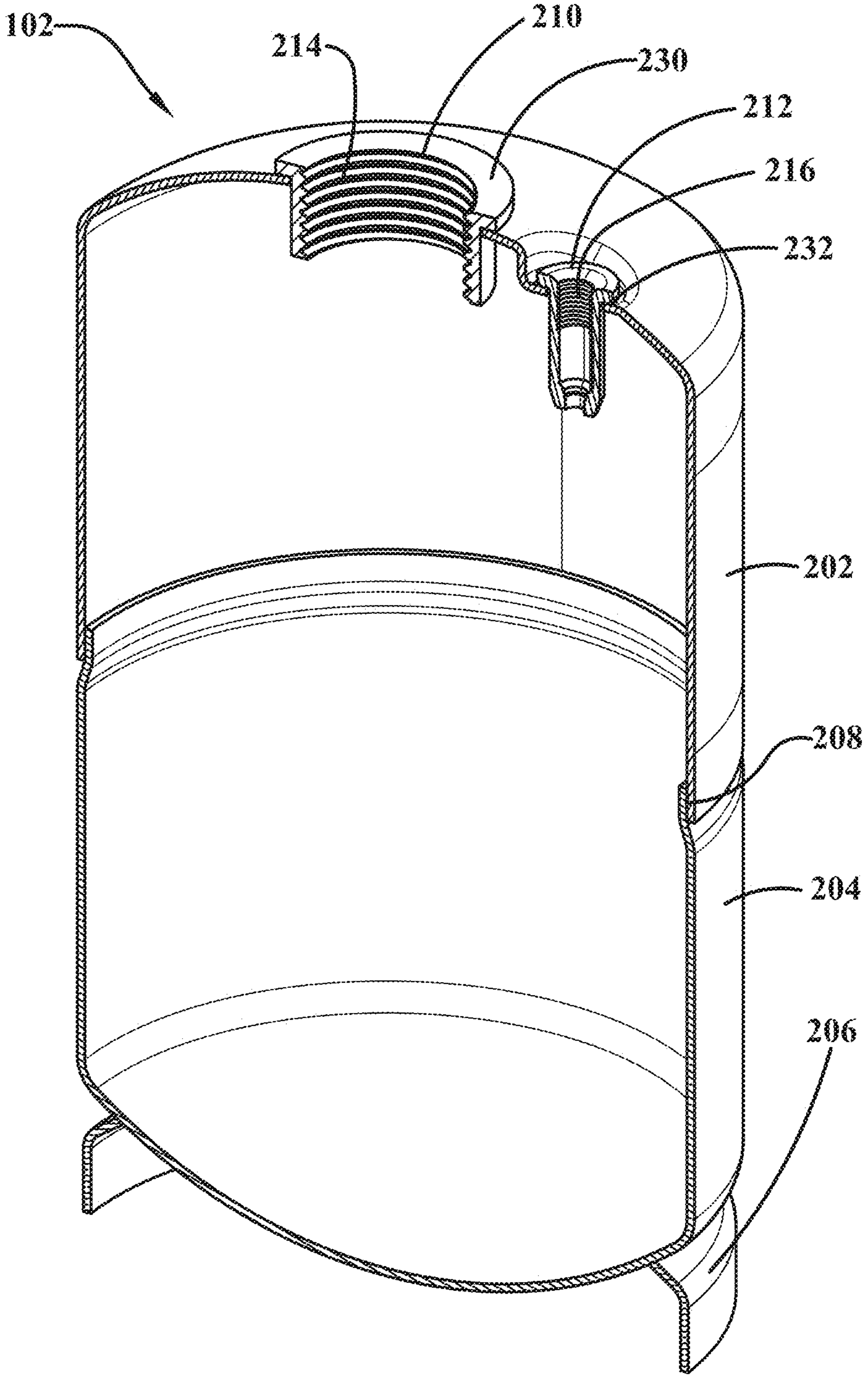
FIG. 4 is a cross-sectional view of an exemplary implementation of a refillable propane tank as described herein.

Turning to FIGS. 2-4, the refillable tank 102 is shown in greater detail. By way of example, the refillable tank 102 may be a refillable one pound propane tank. The refillable tank 102 may be manufactured from any material such as metal, steel, composites, or other suitable tank materials. The refillable tank 102 may comprise a top section 202 and a bottom section 204. The top section 202 and the bottom section 204 may be welded together at a weld joint 208 to form the tank 102. The refillable tank 102 may further comprise a support collar 206 affixed to (e.g., by welding, etc.) the bottom section 204. It should be appreciated that the refillable tank 102 may be manufactured according to any required specifications set forth by applicable standard setting entities. For example, the refillable tank 102 may be manufactured in accordance with Health and Safety Executive (HSE) DOT-4BA or DOT-39. Those familiar with HSE DOT standards will appreciate that DOT-39 is applicable for non-refillable transportable pressure receptacles. Therefore, the refillable tank 102 may be designed according to applicable specifications such as DOT-4BA so that the refillable tank 102 meets the specified requirements of refillable pressure receptacles.

The refillable tank 102 may further comprise two openings in the top section 202: a first opening 210 and a second opening 212. The first opening 210 may be configured to accept the valve assembly 104, and the second opening 212 may be configured to accept the overpressure valve 110. Each of the first and second openings 210 and 212 may be configured with a first fitting 230 and a second fitting 232, respectively. Each of the first and the second fitting 230 and 232 may comprise threading 214 and 216 extending along an interior surface of the first and second fittings 230 and 232. The threading 214 of the first opening 210 may be configured to engage complementary threading 218 of the valve assembly 104 so that the valve assembly 104 can be removably, threadedly attached to the refillable tank 102 at the first opening 210. The threading 216 of the second opening 212 may be configured to engage complementary threading 220 of the overpressure valve 110 so that the overpressure valve 110 can be remove ably, threadedly attached to the refillable tank 102 at the second opening 212. It should be appreciated that each of the first and second openings 210 and 212 may provide fluid access to an inner chamber of the refillable tank 102.

Figure 5:
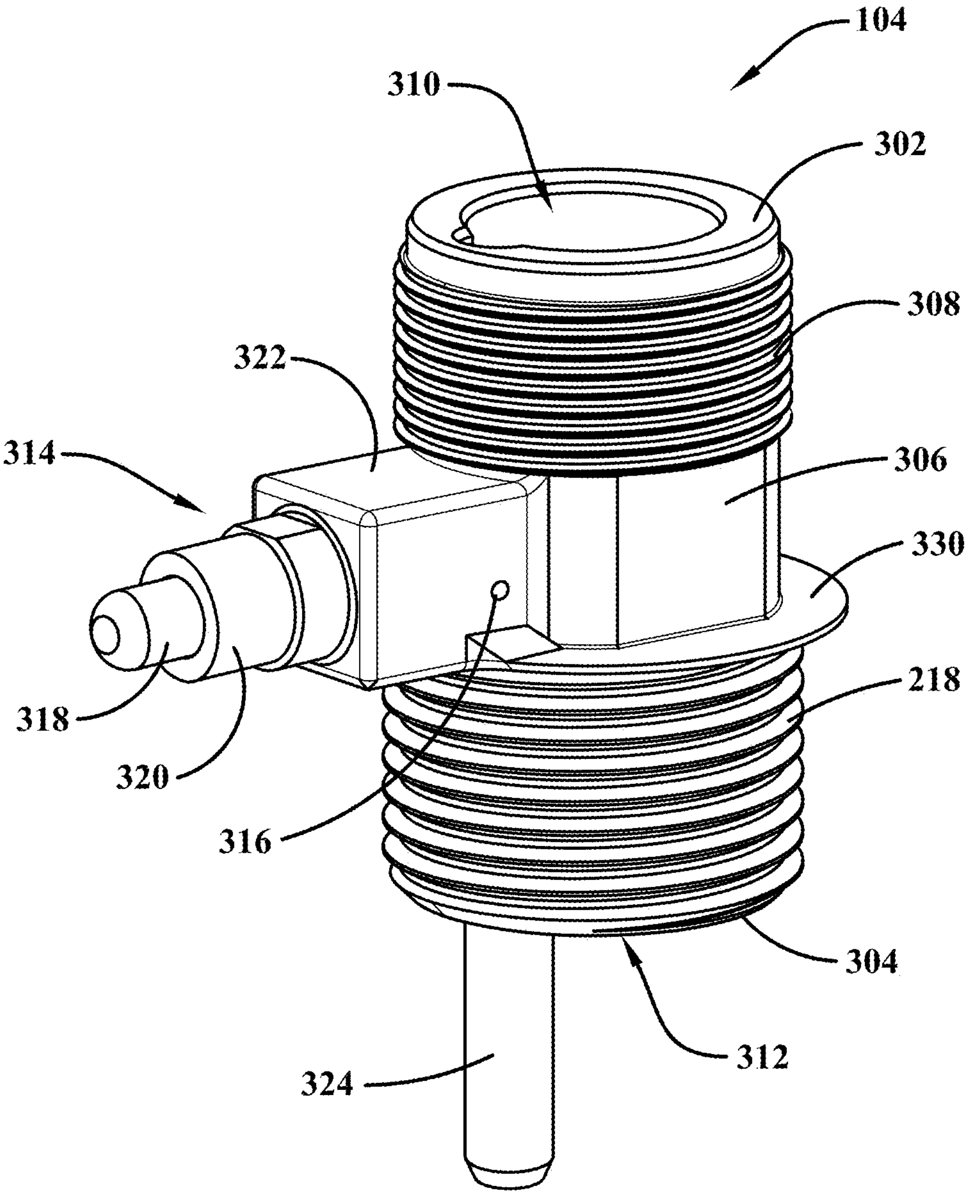
FIG. 5 is an exemplary implementation a valve assembly that may be utilized with any of the systems as described herein.
Figure 6:
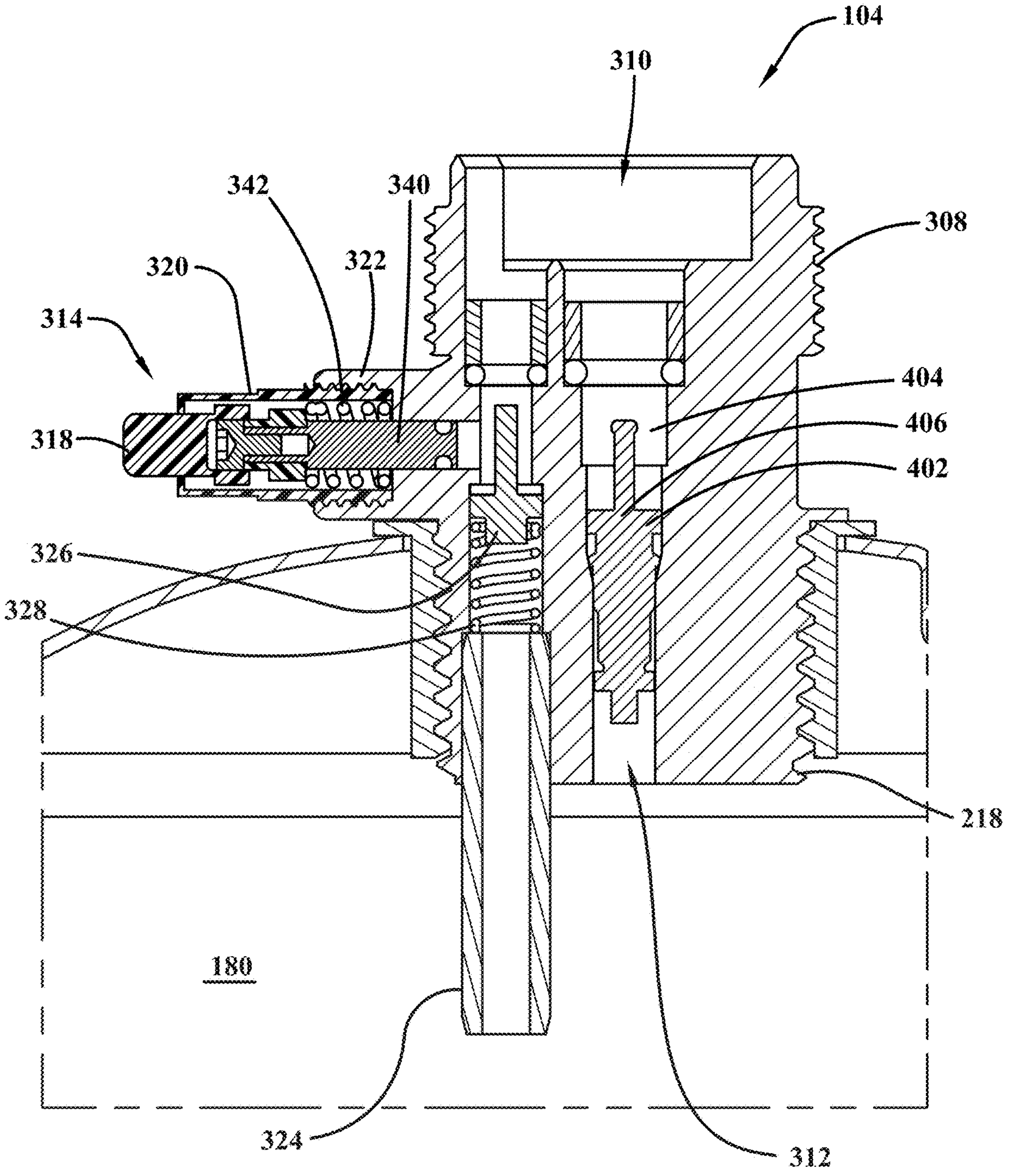
FIG. 6 is a cross-sectional view of an exemplary implementation of a valve assembly that may be utilized with any of the systems as described herein.

Turning to FIGS. 5-6, an exemplary implementation of the valve assembly 104 is shown. The valve assembly 104 may comprise a first end 302, a second end 304, and a body 306 located between the first end 302 and the second end 304. The first end 302 may comprise at least one opening 310, and the second end 304 may comprise at least one opening 312 such that the opening 310 is in fluid communication with opening 312. The valve assembly 104 can comprise threading 308 proximate the first end 302 and extending around a circumference of the valve assembly 104. The threading 308 may be configured to threadedly engage with complementary threading along an interior of the connector 106. As discussed above, the threading 218 may engage with threading 214 along the interior of the opening 210 of the refillable tank 102. The valve assembly 104 may further comprise a collar 330 extending radially outward and around the circumference of the body 306. The collar 330 may be located between the threading 308 and the threading 218. The collar 330 may be configured to engage a surface of the first end 202 of the refillable tank 102 when the valve assembly 104 is installed in the opening 210 of the refillable tank 102.

The valve assembly 104 may further comprise an overfill valve assembly 314. As illustrated in FIGS. 5 and 6, the overfill valve assembly 314 may comprise an outlet port 316, a pushbutton 318, a first body portion 320, a second body portion 322, and a dip-tube 324. As best illustrated in FIG. 6, the overfill valve assembly 314 may further include an overfill valve 326, and overfill valve spring 328, a overfill pin 340, and overfill pin spring 342. The overfill valve assembly 314, when in an opened configuration, may fluidly connect the inner chamber 180 with the outlet port 316. For example, when the overfill valve assembly 314 is open, propane from the inner chamber 180 of the refillable tank 102 can pass through the outlet port 316 when propane within the inner chamber 180 reaches the dip-tube 324. Additional details of the overfill valve assembly 314 are presented below.

The valve assembly 104 may also comprise a fill valve 402 located within a throughpassage 404. The throughpassage 404 may extend through the body 306 of the valve assembly 104 from the first opening 310 to the second opening 312. By way of example, and not limitation, the fill valve 402 may be a Schrader Valve, or similar type. It should be appreciated, however, that the fill valve 402 may be any suitable type of valve according to sound engineering judgement. The fill valve 402, when in an opened configuration, can fluidly couple the first opening 310 with the second opening 312, through the throughpassage 404. For example, this may allow propane to be transferred through the throughpassage 404 from the first opening 310 to the second opening 312 such that propane may be transferred into the inner chamber 180 of the refillable tank 102. The operation of the valve assembly 104 will be described below in detail with respect to FIGS. 9-12, with alternate assemblies shown in FIGS. 13, 14, and 15 and 16.

Figure 7:
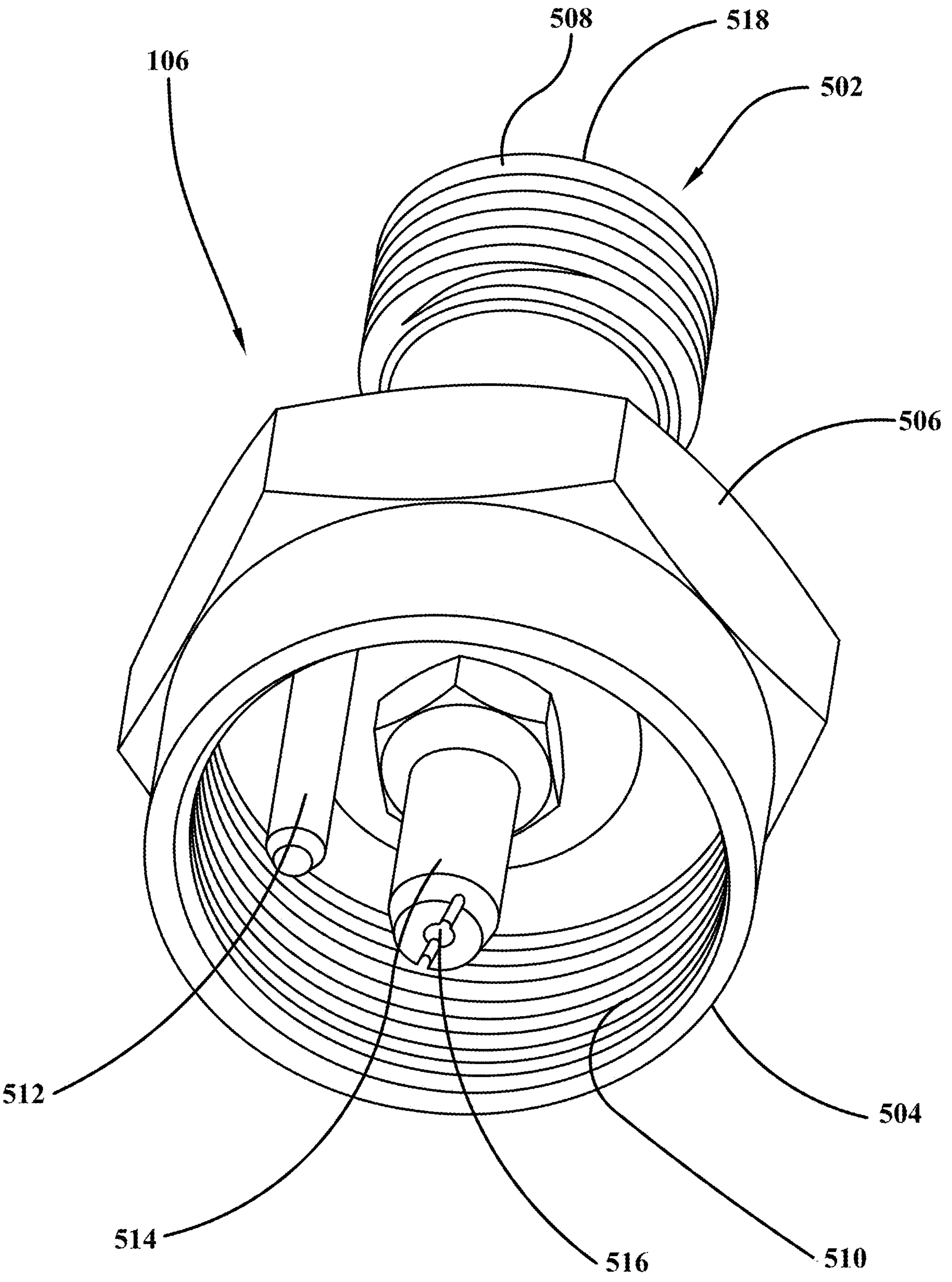
FIG. 7 is a bottom perspective view of an exemplary implementation a connector that may be utilized with any of the systems as described herein.
Figure 8:
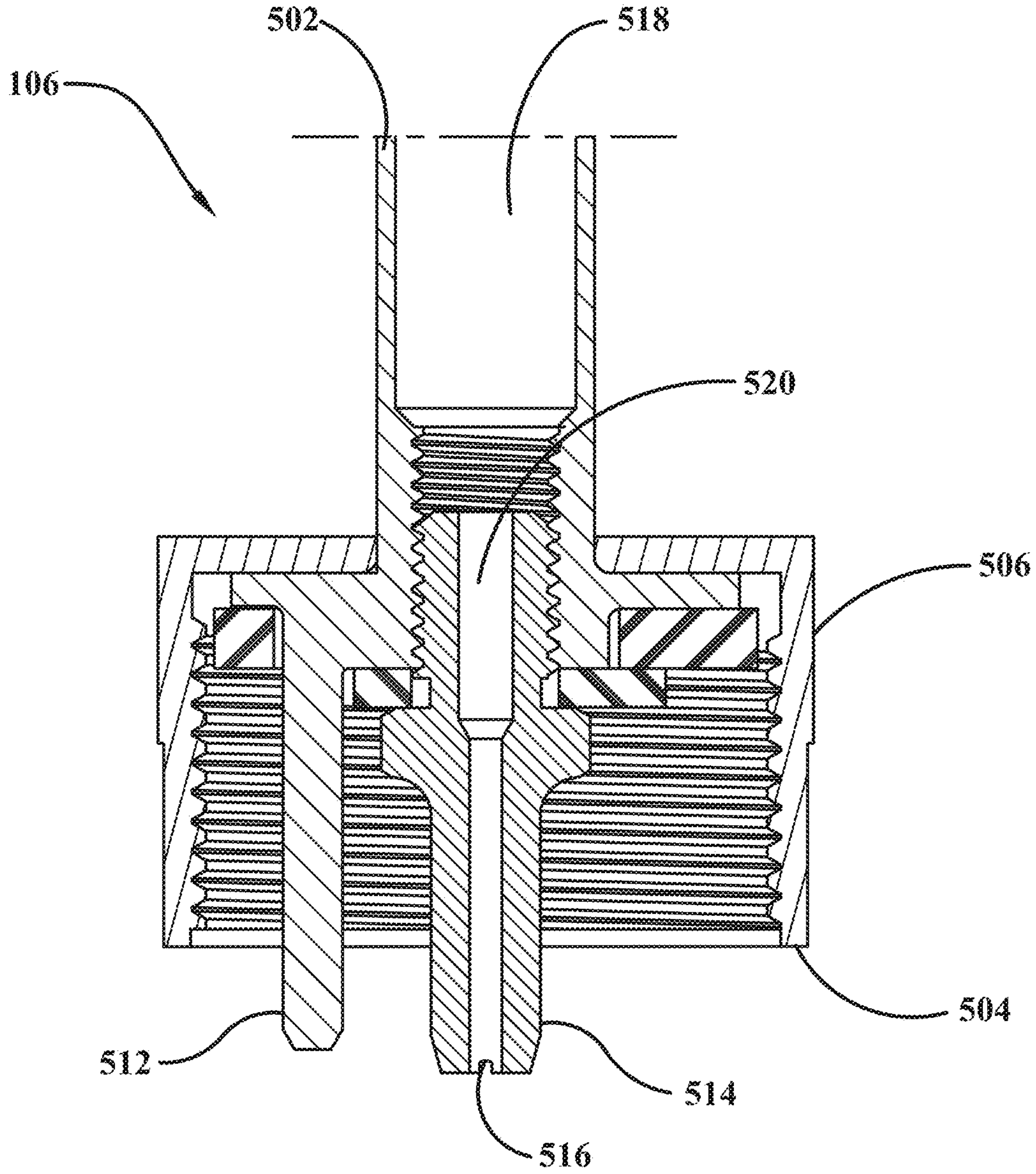
FIG. 8 is a cross-sectional view of an exemplary implementation a connector that may be utilized with any of the systems as described herein.

Turning to FIGS. 7-8, an exemplary implementation of the connector 106 is shown. The connector 106 may comprise a first end 502, a second end 504, and a body 506 located between the first end 502 and the second end 504. The first end 502 may comprise threading 508 along the outside of the connector 106 that may engage complementary threading of the manual valve 108. Similarly, the second end 504 may comprise threading 510 along the interior of the second end 504 that may engage complementary threading 308 of the valve assembly 104. The connector 106 may further comprise a first prong 512 and a second prong 514. The first prong 512 may operably engage with and depress the overfill valve 326 against the overfill valve spring 328. The second prong 514 may operably engage with and depress the fill valve 402 against the fill valve spring 406.

The second prong 514 may further comprise an opening 516 at the end of the second prong 514. The opening 516 may be in fluid communication with an opening 518 at the first end 502 such that propane may travel through the throughpassage 520 from the first end 502 to the second end 504. In this manner, propane may be transferred out of the opening 516 and into the throughpassage 404 of the valve assembly 104. Thus, when the fill valve 402 is in an opened configuration, the connector 106, valve assembly 104, and chamber 180 can be fluidly coupled, such that propane may travel through the connector 106, through the valve assembly 104, and into the chamber 180 of the refillable tank 102. The interaction between the connector 106 and the valve assembly 104 is described in greater detail with respect to FIGS. 9 and 10.

Figure 9:
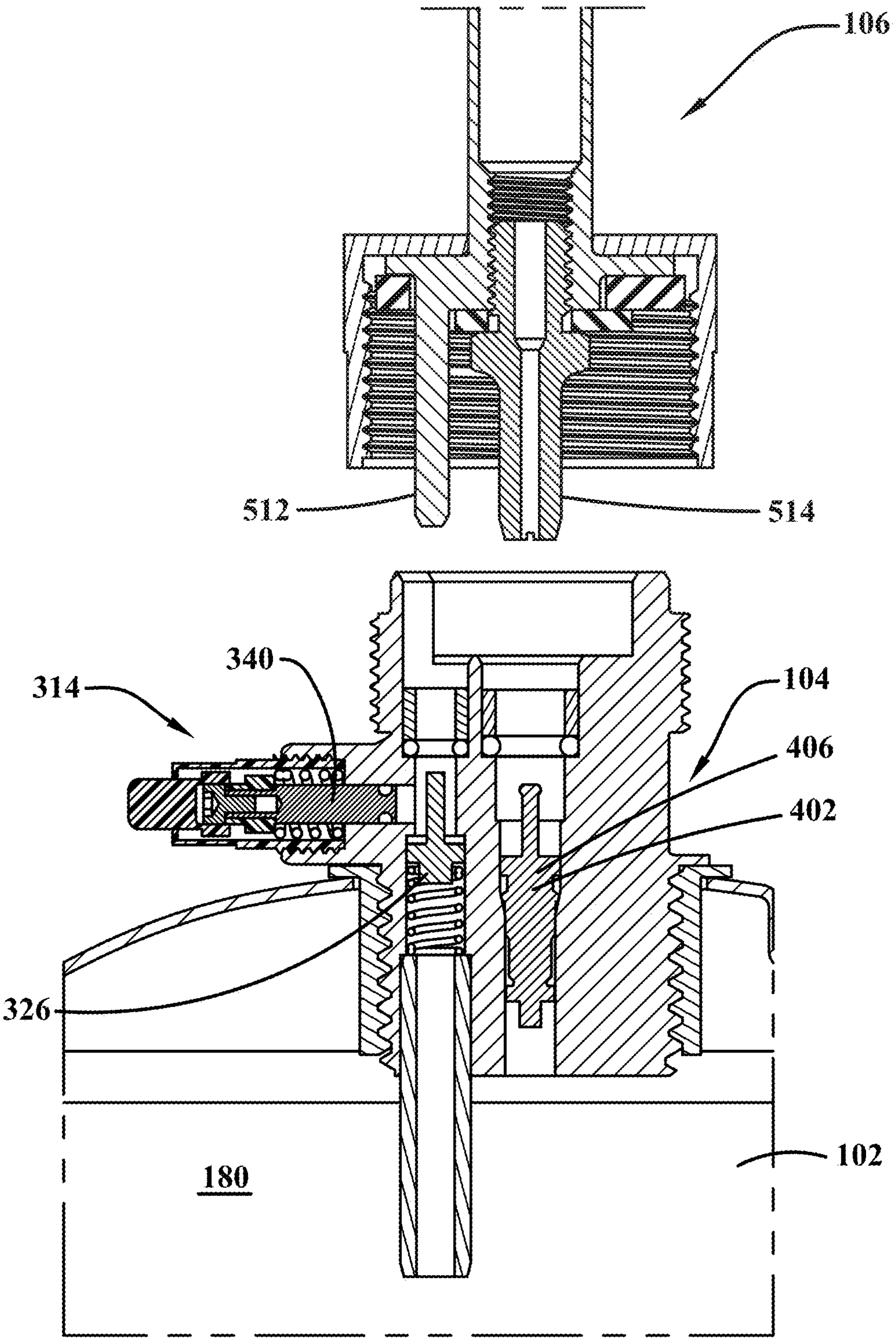
FIG. 9 is a cross-sectional view of the connector, the valve assembly, and the refillable propane tank.

FIG. 9 illustrates the connector 106 aligned with and detached from the valve assembly 104. The fill valve 402 and the overfill valve 326 may both be normally closed valves. Namely, the fill valve 402 and the overfill valve 326 may be biased in a closed configuration to close any fluid passage between the chamber 180 and the outside environment, such that fluid or gas does not pass the respective valves when closed. Therefore, it should be appreciated, that when the connector 106 is detached from the valve assembly 104, the fill valve 402 and the overfill valve 326 may be biased in a closed configuration such that propane cannot enter or exit the inner chamber 180 of the refillable tank 102. One will also appreciate, that the overfill valve 326, when closed, may prevent propane from exiting the output port 316 regardless of the position of the pin 340. In this manner, the overfill valve assembly 314 may comprise a two stage process (e.g., one stage being the overfill valve 326 and the other stage being the pin 340.

Figure 10:
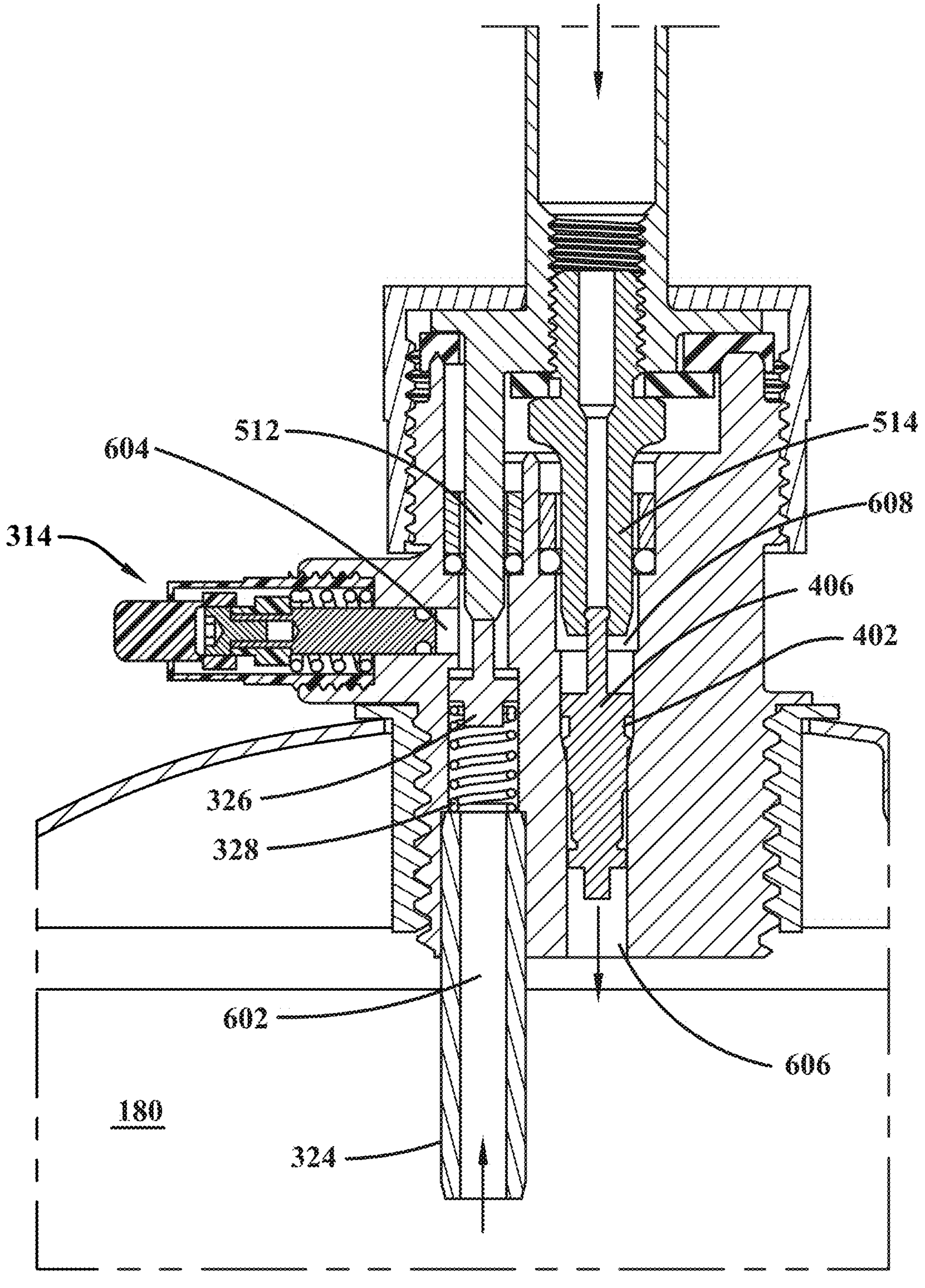
FIG. 10 is a cross-sectional view of the connector, the valve assembly, and the refillable propane tank, where the connector is inserted into the valve assembly.

FIG. 10 illustrates the connector 106 attached to the valve assembly 104. As illustrated, when the connector 106 is attached to the valve assembly 104, the first prong 512 may engage with and depress the overfill valve 326 against the overfill valve spring 328. Similarly, the second prong 514 may engage with and depress the fill valve 402 against the fill valve spring 406. It should be appreciated that the first prong 512 and the second prong 514 can be configured such that the first prong 512 and the second prong 514 engage the overfill valve 326 and the fill valve 402 substantially simultaneously (e.g., at the same level, or same point in time) by adjusting the length of the prongs 512 and 514 accordingly; or at different or alternate points of contact. It should also be appreciated that the length of the prongs 512 and 514 may be adjusted such that the overfill valve 326 is engaged before the fill valve 402. Similarly, the length of the prongs 512 and 514 may be adjusted such that the fill valve 402 is engaged before the overfill valve 326. As illustrated, the first prong 512 and the second prong 514 extend past the second end 504 of the connector 106, but it is to be appreciated that prongs 512 and 514 may be configured such that they do not extend past the second end 504.

In an exemplary implementation, when the first prong 512 depresses the overfill valve 326 against the overfill valve spring 328, the overfill valve 326 may transition from a closed configuration to an opened configuration. When the overfill valve 326 is in an opened configuration, fluid communication between the chamber 602 and the chamber 604 may be possible. Similarly, when the second prong 514 depresses the fill valve 402 against the fill valve spring 406, the fill valve 402 may transition from a closed configuration to an opened configuration. When the fill valve 402 is in an opened configuration, fluid communication between the chamber 606 and the chamber 608 may be possible. It should be appreciated that when the connector 106 is affixed to the valve assembly 104, that both the overfill valve 326 and the fill valve 402 may be transitioned to opened positions to allow the refillable tank 102 to be filled.

Figure 11:
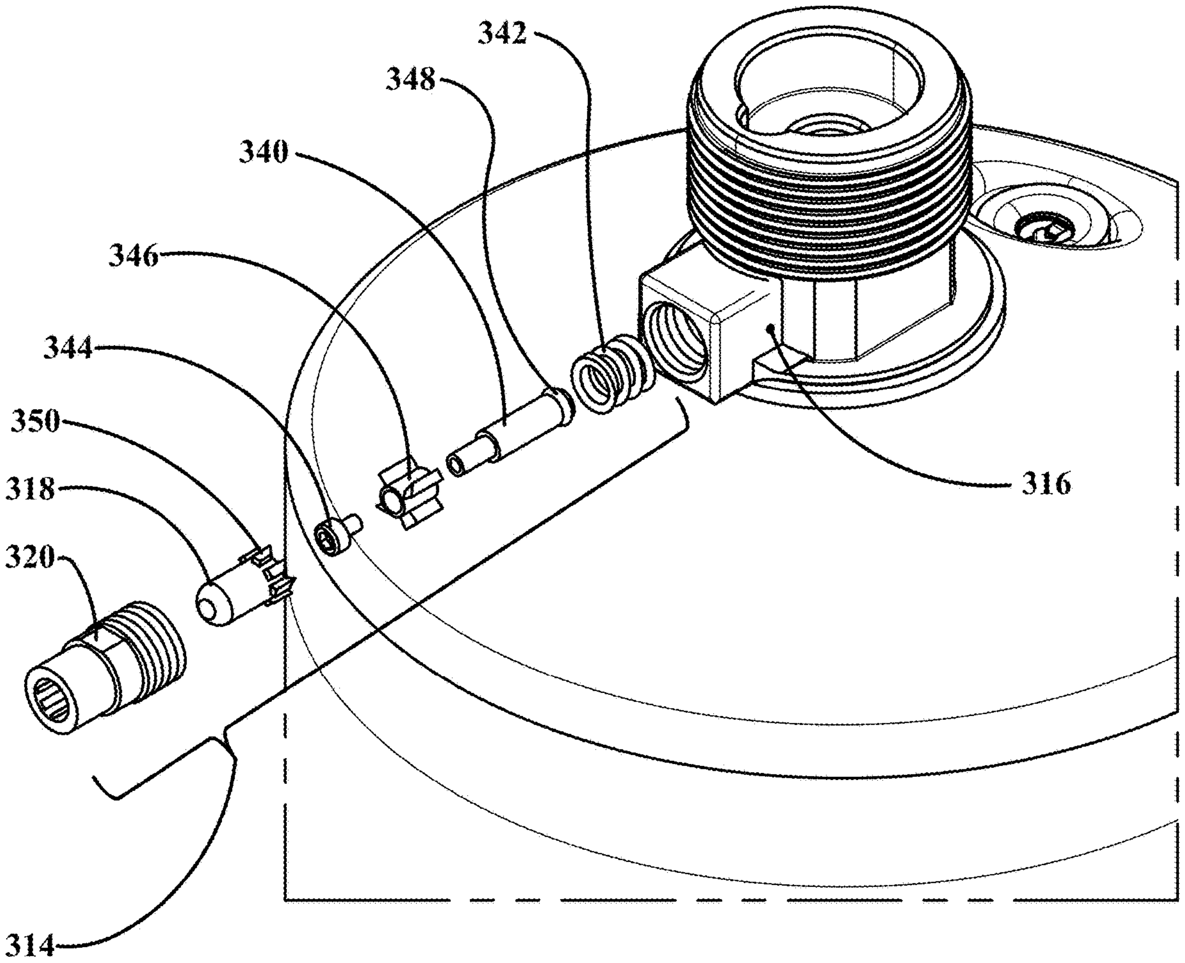
FIG. 11 is an exploded view of an exemplary implementation of an overfill valve assembly.

FIG. 11 illustrates an exploded view of an exemplary implementation of an overfill valve assembly 314 of the valve assembly 104. The overfill valve assembly 314 may comprise the pushbutton 318, a first body portion 320, the overfill pin 340, the overfill pin spring 342, a cam pin 344, and a cam base 346. The overfill pin 340 may comprise an O-ring 348 to improve sealing between the overfill pin 340 and a surface of the valve assembly 104. For example, the improved seal may mitigate the leaking of propane from the outlet port 316.

FIGS. 12A-D illustrate various exemplary implementations and positions of the overfill valve assembly 314. The pushbutton 318 may be configured to transition the overfill pin 340 between the opened and closed position upon pressing and releasing the push button 318. As the push button 318 is pressed, cam features 350 of the pushbutton 318 may follow corresponding features on the cam base 346 causing the overfill pin 340 to transition from an opened position to a closed position using the biasing force of the overfill pin spring 342. The figures that follow illustrate an exemplary implementation of the overfill assembly 314 and an exemplary mode of operation.

Figure 12A:
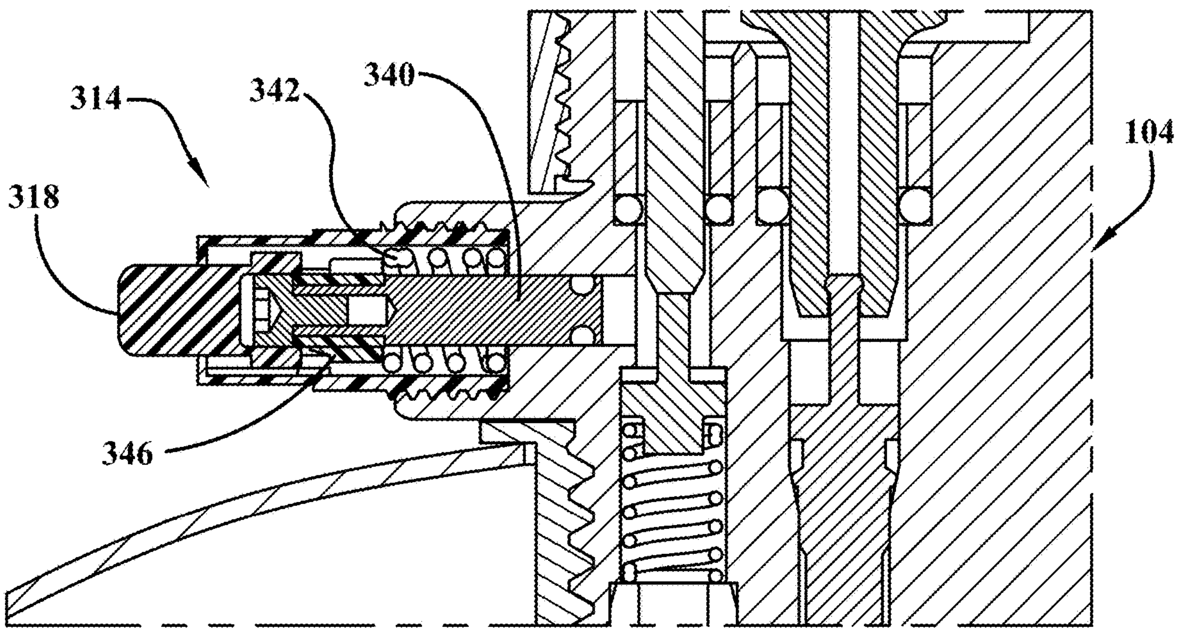
FIGS. 12A, 12B, 12C, and 12D are cross-sectional views of the connector and the valve assembly, with the overfill valve disposed in various positions.

FIG. 12A illustrates an exemplary implementation of the overfill pin 340 of the overfill valve assembly 314 in the closed position. In this position, fluid coupling between the chamber 604 and the output port 316 is cut off, and propane may be prevented from exiting the chamber 604 through the output port 316.

Figure 12B:
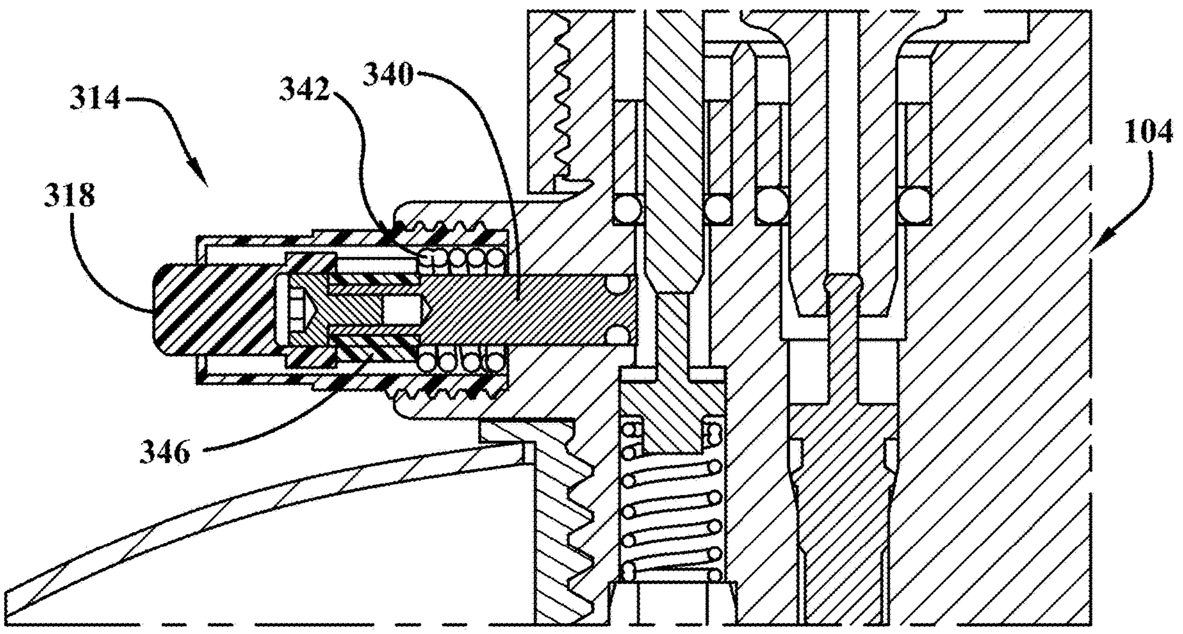

FIG. 12B illustrates an exemplary implementation of the pushbutton 318 on a first push/button press. In this position, the overfill pin 340 of the overfill valve assembly 314 is disposed in the closed position, and fluid coupling between the chamber 604 and the output port 316 is cut off, such that propane may be prevented from exiting chamber 604 through the output port 316. When the pushbutton is released, the cam base 346 may be rotated ninety degrees.

Figure 12C:
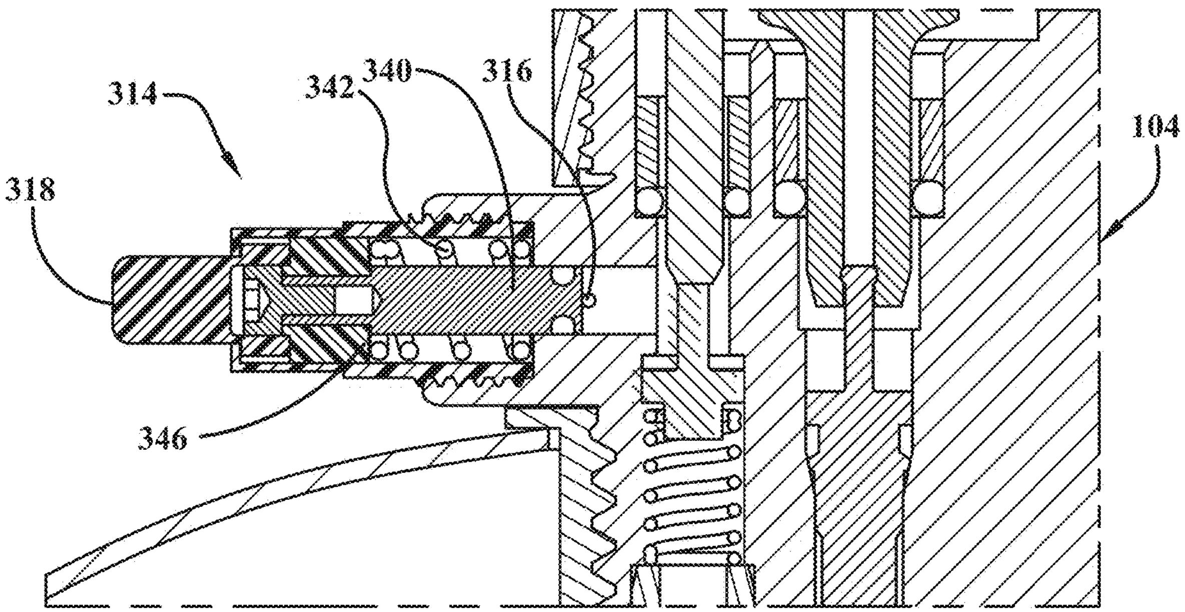

FIG. 12C illustrates an exemplary implementation of the overfill pin 340 in an opened position following the ninety-degree rotating of the cam base 346. In the open position/configuration, the overfill pin 340 is translated in a direction away from the valve assembly 104 such that a fluid passage between the output port 316 chamber 604 is opened. In this manner, propane may be allowed to exit from the chamber 604 through the output port 316 and into the surrounding environment.

Figure 12D:
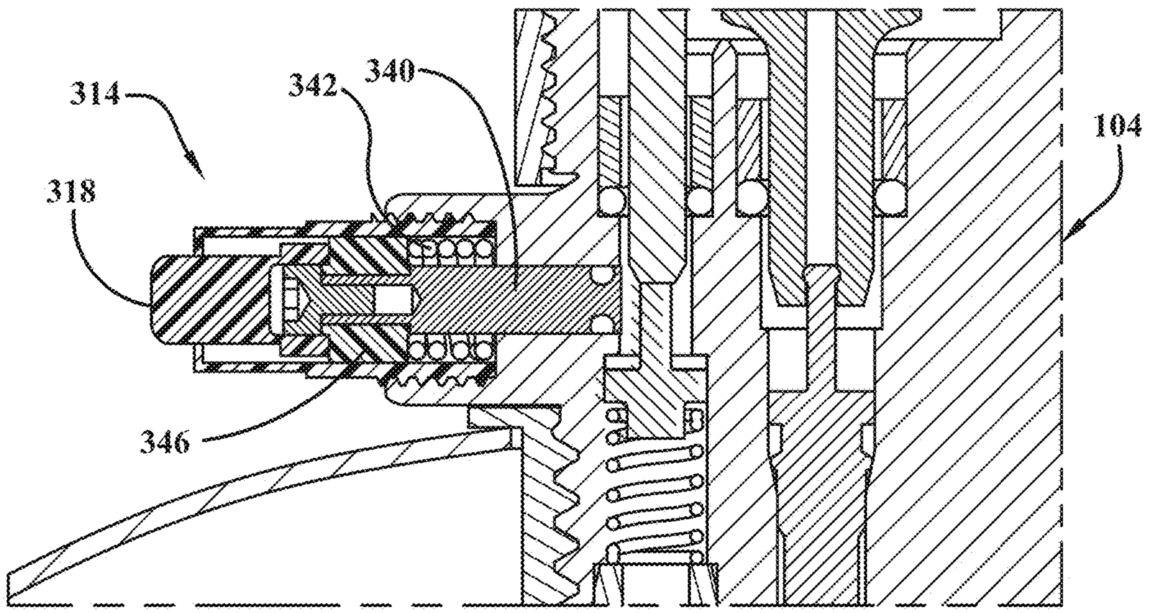

FIG. 12D illustrates and exemplary implementation of the pushbutton 318 on a second push/button press. In this position, the overfill pin 340 of the overfill valve assembly 314 is returned to the closed position, and the fluid coupling between the chamber 604 and the output port 316 is cut off again, such that propane may be prevented from exiting chamber 604 through the output port 316. When the pushbutton is released, the cam base 346 may be rotated ninety degrees such that the overfill pin 340 is translated back to the closed position.

Returning back FIG. 12A, when the button 318 is again depressed, we illustrate an exemplary implementation of the overfill pin 340 of the overfill valve assembly 314 in the closed position following the second button press. In this position, propane may be prevented from exiting chamber 604 through the output port 316.

Figure 13:
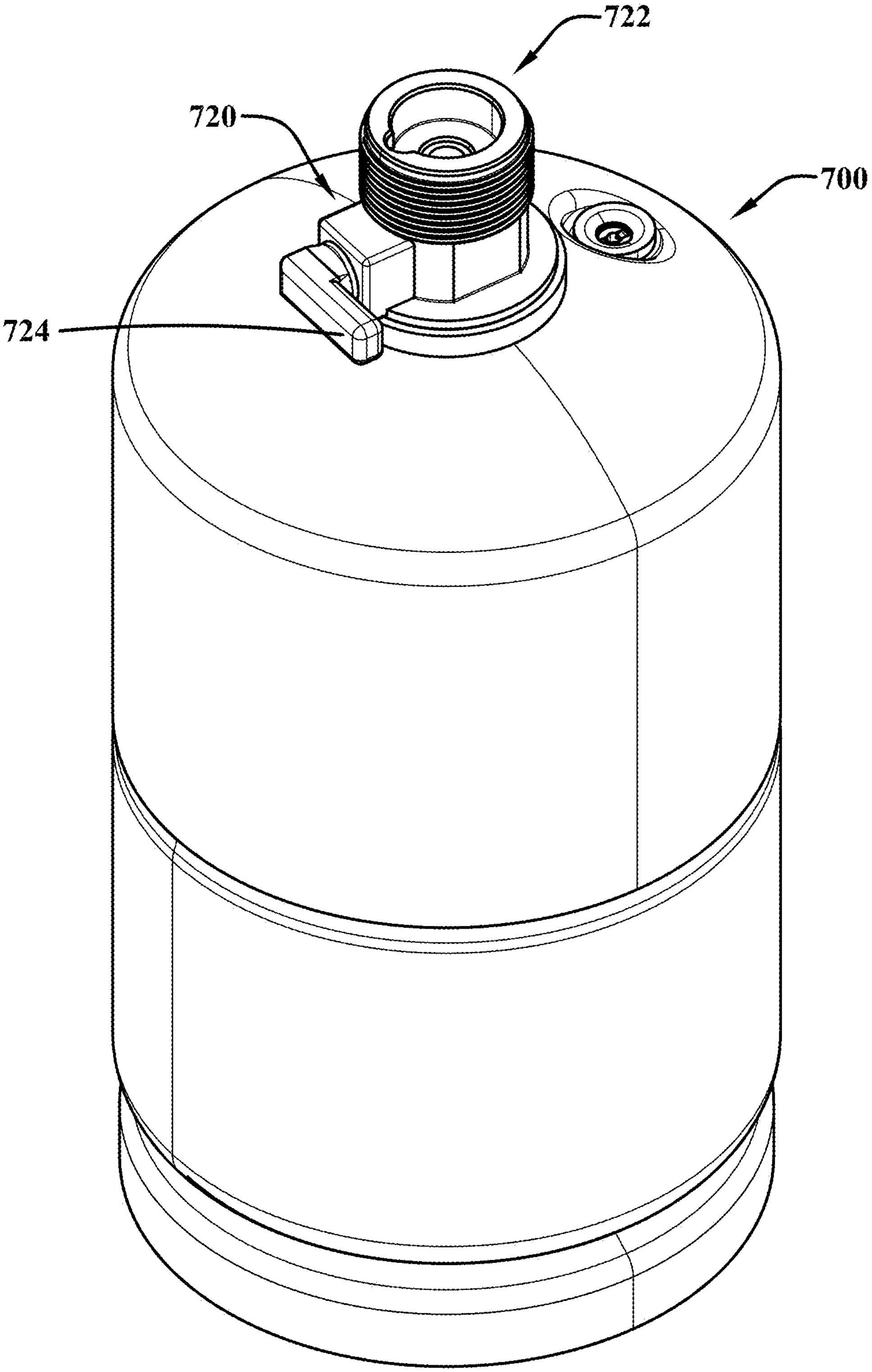
FIG. 13 is a component illustration of another example of a refillable tanks with alternate valving.
Figure 14B:
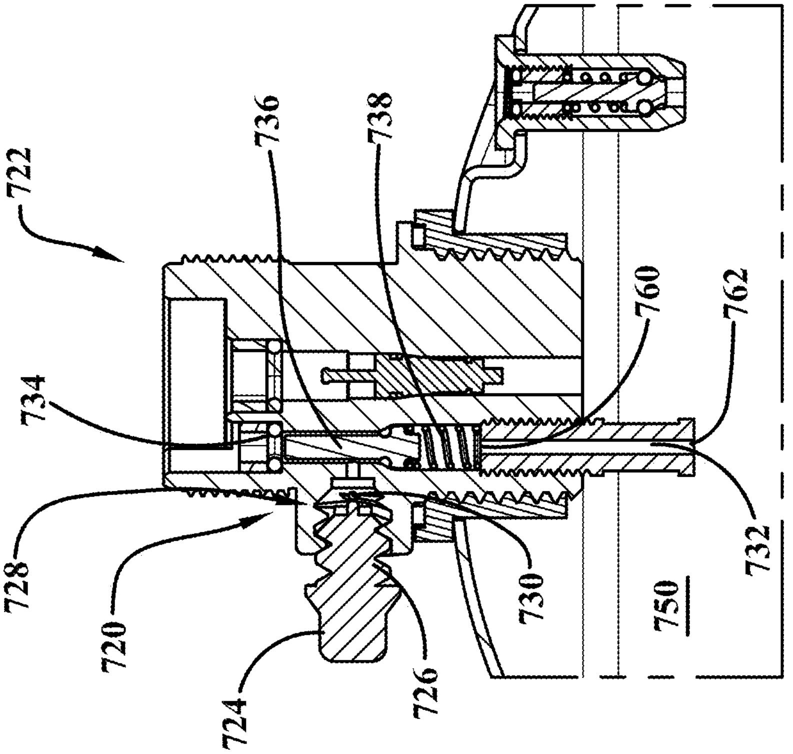
FIGS. 14A and 14B are cross-sectional view of the alternate connector and valve assembly, in a closed and open position.
Figure 14A:
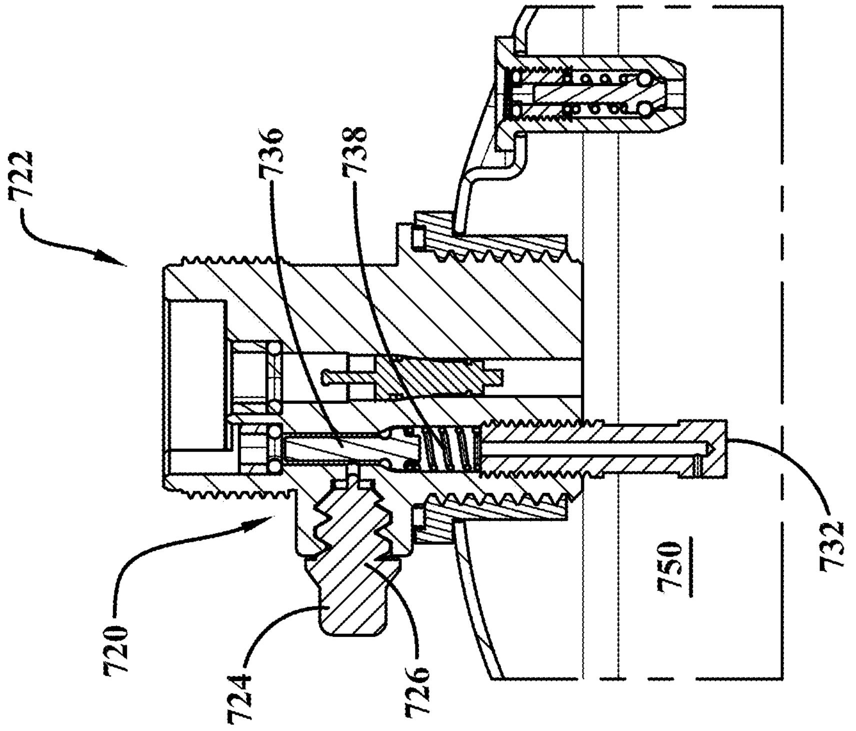
Figure 15:
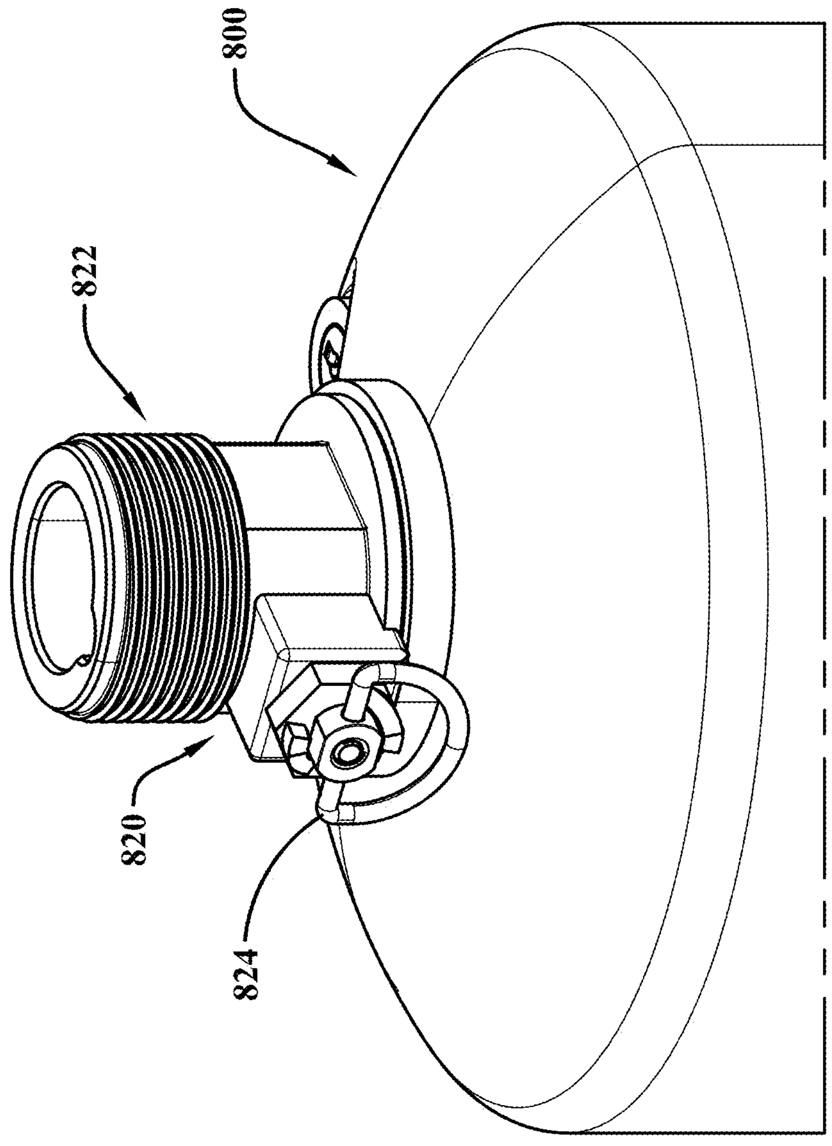
FIG. 15 is a component diagram of a portion of an example refillable tank with another alternate connector and valve assembly.

FIGS. 13, and 14A and B illustrate an alternate implementation of an overfill valve assembly 720 disposed in an example refillable tank 700, as part of a valve assembly 722 for the tank 700. In this example implementation, the overfill valve assembly 720 comprises a manually operated actuator 724 (e.g., a handle) disposed external to the valve assembly 720, and configured to be operated by a user. Further, the actuator 724 is fixedly engaged with a threaded post 726 that is threadedly engaged with a complementary threaded overfill cavity 728 in the overfill valve assembly 720. In operation, the handle actuator 724 can be rotated (e.g., counterclockwise) resulting in the threaded post 726 to be drawn out of the threaded overfill cavity 728, as shown in FIG. 14B. Opening the valve effectively opens the overfill valve 720 to allow fluid to pass from inside the tank to the outside. The Actuator 724 can be rotated in the other direction to effectively close the valve 720.

An overfill outlet 730 is disposed in the threaded overfill cavity 728. When the threaded post 726 is disposed in the closed position (FIG. 14A) the overfill outlet 730 is closed by the threaded post 726. When the threaded post is disposed in the open position (FIG. 14B), the overfill outlet 730 is fluidly coupled with the threaded overfill cavity 728, which is fluidly coupled with an interior of the refillable tank 750, through a passage in an overfill valve dip-tube 732. In this implementation, the overfill valve assembly 720 comprises the overfill dip-tube 732, which comprises a hollow body with a first opening 760 disposed outside of the refillable tank 150 in fluid communication with the overfill valve 736, and a second opening 762 disposed inside the refillable tank 150. As an example, a position (e.g., height in the tank 150) of the second opening 762 is disposed at a predetermined fluid level height.

That is, with reference to FIGS. 8 and 9, for example, when a first prong 512 of the connector 106 is inserted through an O-ring seal 734 of the overfill valve assembly 720, it can engage and depress the overfill valve 736. When the overfill valve 736 is depressed against an overfill valve spring 738, fluid in the tank 750 (e.g., propane) may flow from the dip-tube 732 through the overfill valve 736. The fluid 750 (e.g., propane vapor) may then flow into the threaded overfill cavity 728, but is mitigated from release into the environment through the output 730 at least until the threaded post 726 of the overfill valve assembly 720 is retracted. Therefore, for fluid (e.g., propane vapor) to be released through the output 730, the overfill valve 736 is opened, and the actuator 724 rotated to retract the threaded post 726 to expose the outlet port 730.

Figure 16B:
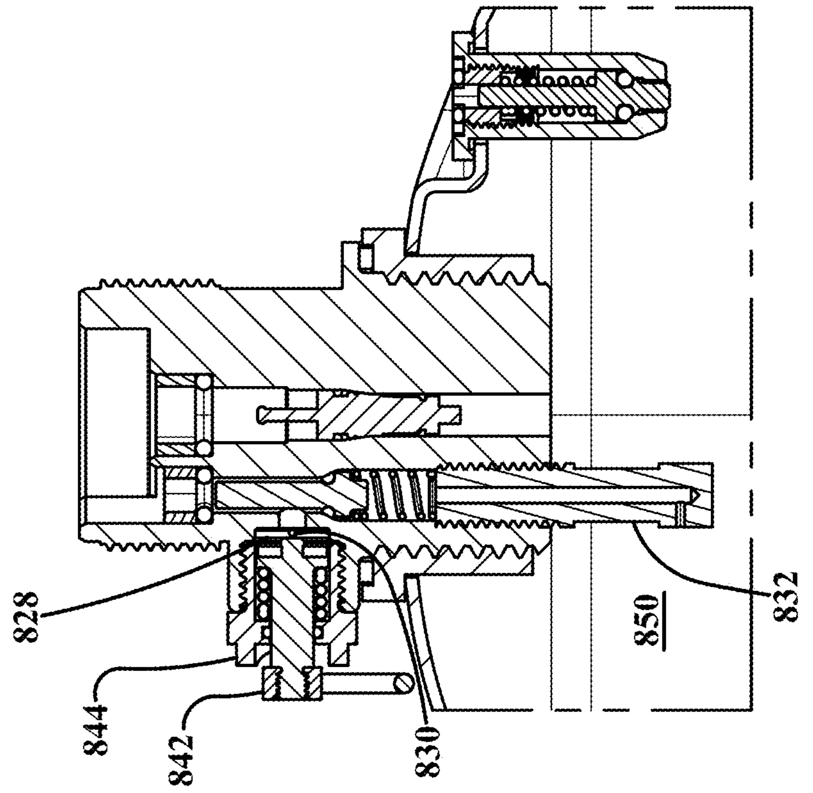
FIGS. 16A, 16B, 16C, and 16D are various cross-sectional and perspective views of the other alternate connector and the valve assembly, where the overfill valve is in a closed and open position.
Figure 16A:
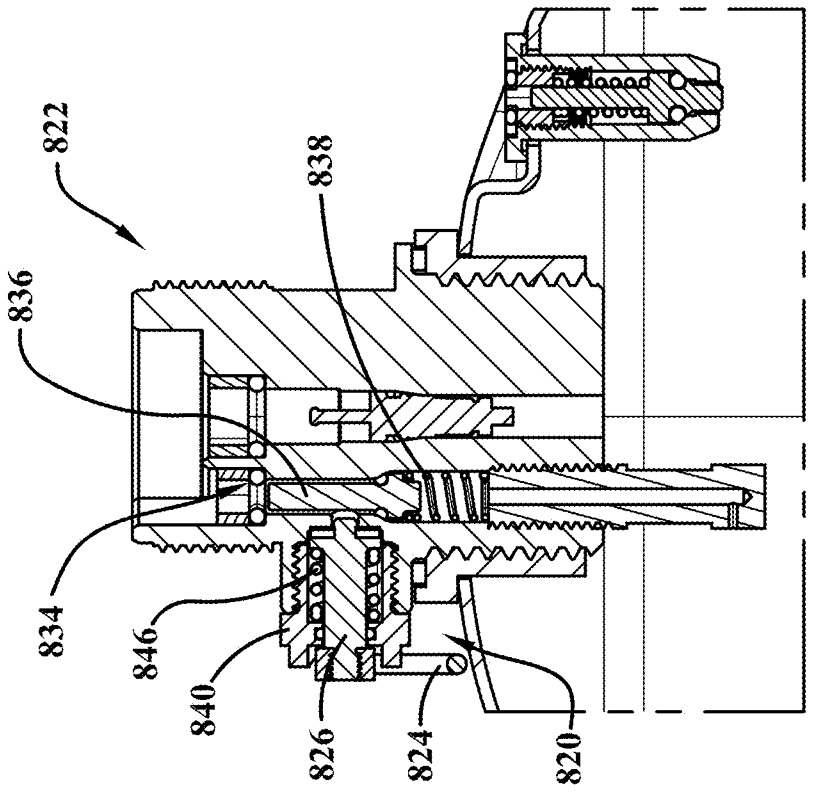

FIGS. 15 and 16A, 16B, and 16C illustrate another alternate implementation of an overfill valve assembly 820 disposed in an example refillable tank 800, as part of a valve assembly 822 for the tank 800. In this example implementation, the overfill valve assembly 820 comprises a manually operated actuator 824 (e.g., a ring) disposed external to the valve assembly 820, and configured to be operated by a user. Further, the actuator 824 is fixedly engaged with a valve post 826. The valve post 826 is disposed in a sleeve 840 that is threadedly engaged with a complementary threaded overfill cavity 828 in the overfill valve assembly 820. Further, the actuator 824 comprises a collar 842 that engages the actuator 824 with the post 826 (e.g., in a threaded engagement). In this implementation, a straight portion 852 of the actuator 824 slidably engages with a ramp 844 when the actuator 824 is rotated. The ramp 844 comprises a slope that rises outward from an inner position 852, where the inner position disposes the valve post 826 in a closed position (FIG. 16A), to an outer position 854, where the outer position disposes the post in an open position (FIG. 16B).

In operation, the ring actuator 824 can be rotated merely in one direction (e.g., clockwise) resulting in the straight portion 852 riding up the ramp from the inner position 852 to the outer position 854. This results in the valve post 826 to be drawn out of the overfill cavity 828, as shown in FIG. 16B. Opening the valve post 826 effectively opens the overfill valve assembly 820 to allow fluid to pass from inside the tank to the outside. The ramp 844 also comprises a shoulder 856 proximate the outer position 854, such that once the actuator 824 reaches the outer position, continued rotation results in the straight portion 852 falling back to the inner position 852, resulting in the closure of the valve post 826, which is biased away from the actuator 824 inside the sleeve 840 by a post spring 846.

Figure 16D:
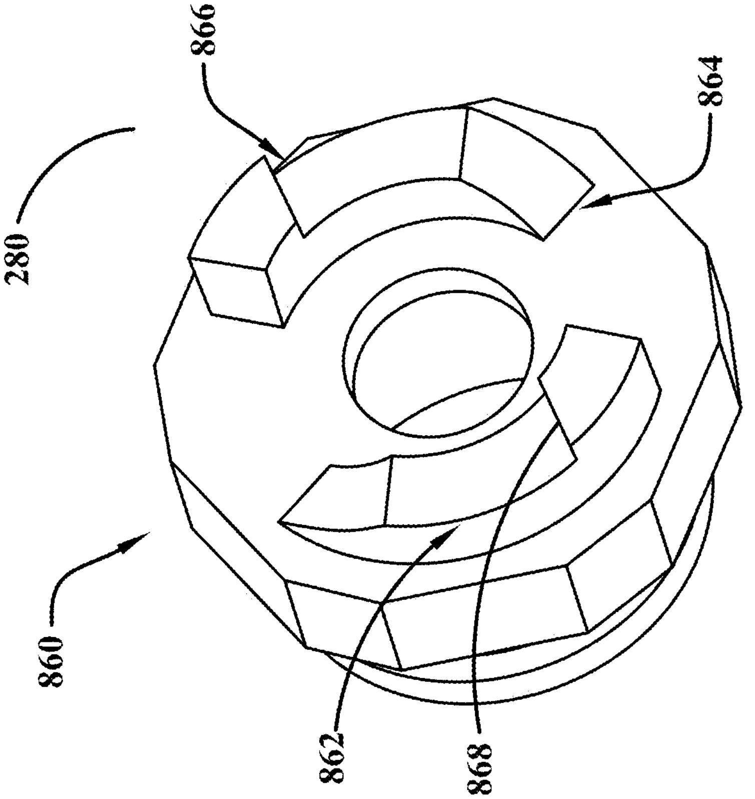
Figure 16C:
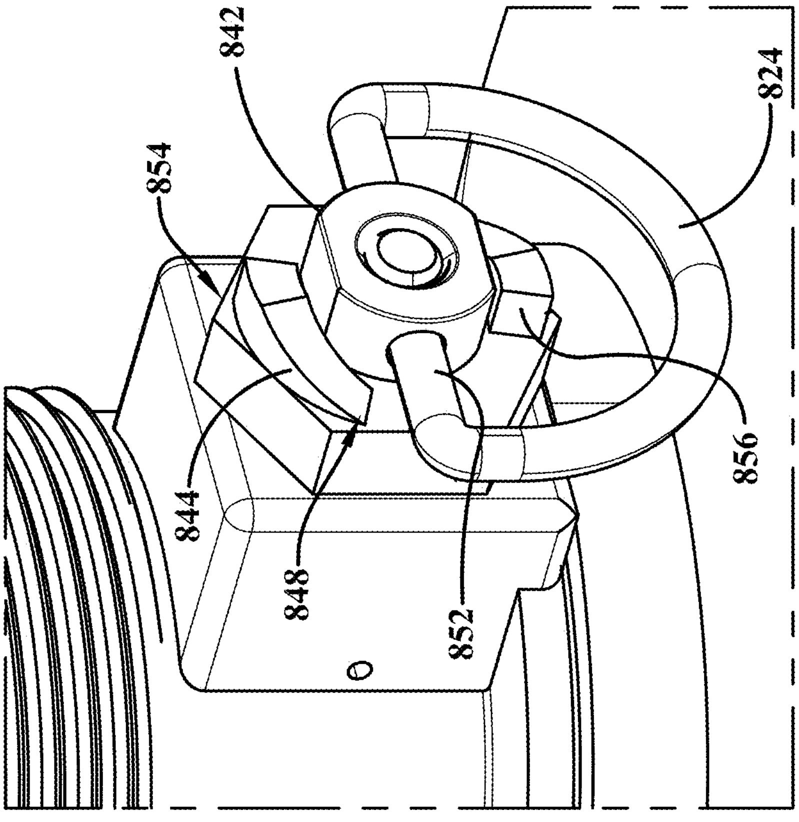

An alternate implementation of a collar 860 for the actuator 824 is illustrated in FIG. 16D. In this implementation, at least one ramp 862 is disposed on the outer surface of the collar 860. The ramp 862 comprises a first or inner position 864 and a second or outer position 866. Further, for example, the ring actuator 824 can be rotated merely in a first direction (e.g., counterclockwise) resulting in the straight portion 852 riding up the ramp 862 from the inner position 864 to the outer position 866. This results in the valve post 826 to be drawn out of the overfill cavity 828, as shown in FIG. 16B. In this implementation, an upper stop 868 is disposed at the top of the ramp and the outer position, which mitigates the continued rotation of the ring actuator 824 past the upper stop 868 in the first direction. As such, the ring actuator 824 can be rotated in a second direction (e.g., clockwise) from the outer position 866 to the inner position 864 to close the valve post 826.

An overfill outlet 830 is disposed in the overfill cavity 828. When the post 826 is disposed in the closed position (FIG. 16A) the overfill outlet 830 is closed by the post 826. When the post 826 is disposed in the open position (FIG. 16B), the overfill outlet 830 is fluidly coupled with the overfill cavity 828, which is fluidly coupled with an interior of the refillable tank 850, through a passage in an overfill valve dip-tube 832. That is, with reference to FIGS. 8 and 9, for example, when a first prong 512 of the connector 106 is inserted through an O-ring seal 834 of the overfill valve assembly 820, it can engage and depress the overfill valve 836. When the overfill valve 836 is depressed against an overfill valve spring 838, fluid in the tank 850 (e.g., propane) may flow from the dip-tube 832 through the overfill valve 836. The fluid 850 (e.g., propane vapor) may then flow into the threaded overfill cavity 828, but is mitigated from release into the environment through the output 830 at least until the post 826 of the overfill valve assembly 820 is retracted. Therefore, for fluid (e.g., propane vapor) to be released through the output 830, the overfill valve 836 is opened, and the actuator 824 rotated to retract the post 826 to expose the outlet port 830.

Figure 17:
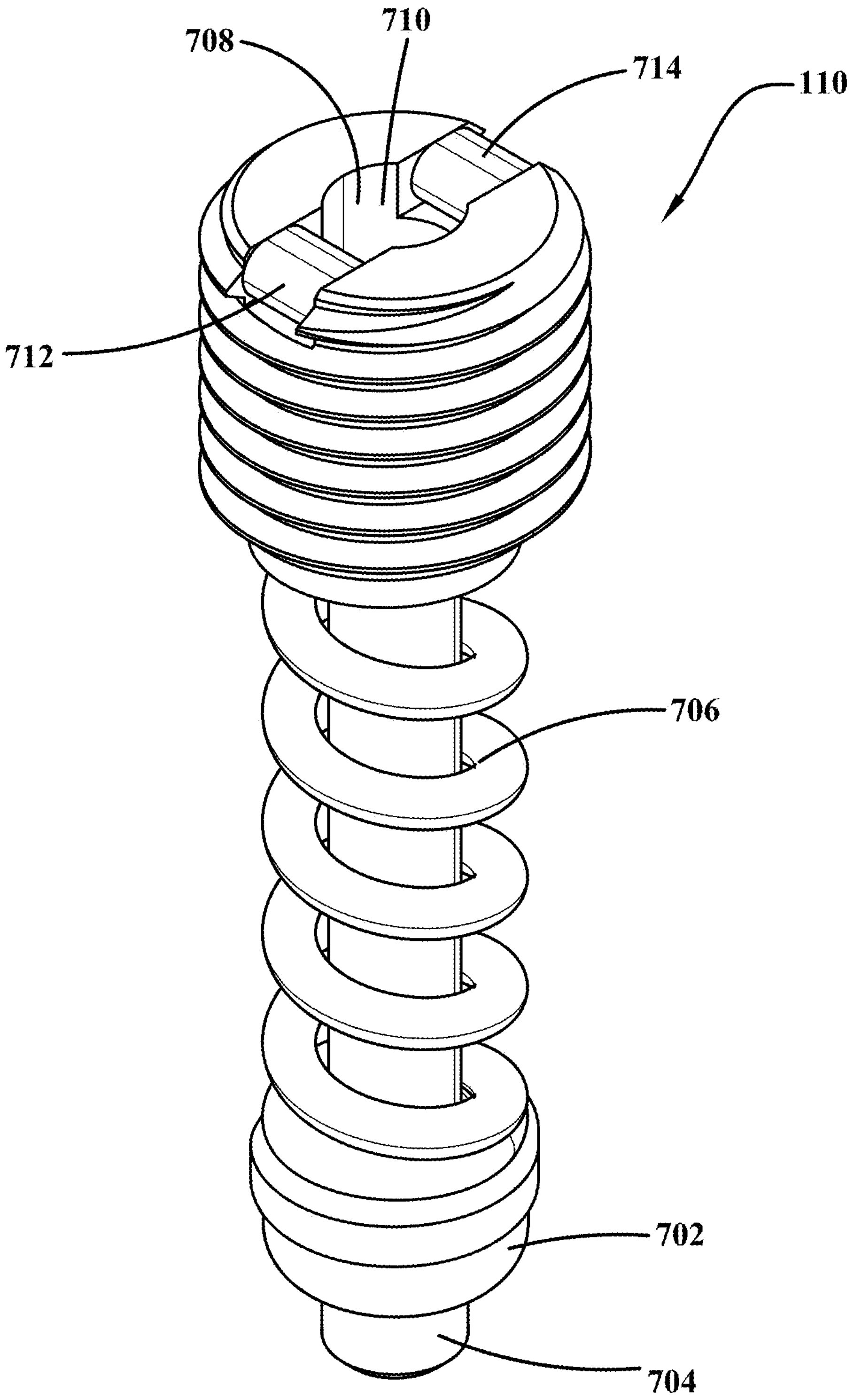
FIG. 17 is an exemplary implementation of an overpressure valve assembly as described herein.
Figure 18:
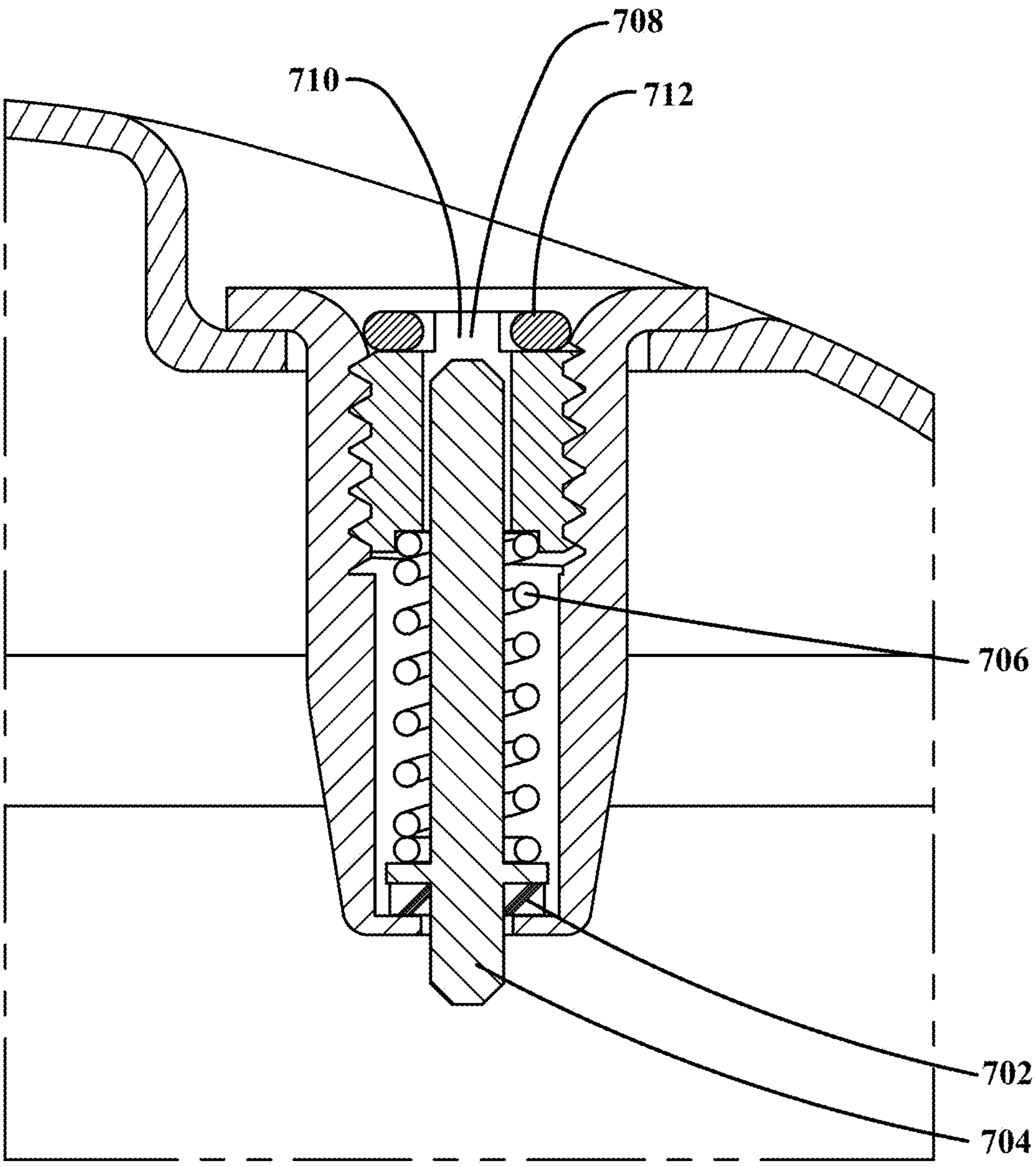
FIG. 18 is a cross-sectional view of an exemplary implementation of the overpressure valve assembly installed in the refillable propane tank.

FIGS. 17 and 18 illustrate an exemplary implementation of the overpressure valve assembly 110. The overpressure valve assembly 110 may comprise a seal 702, a pin 704, a spring 706, and a set screw 708. The seal 702, the pin 704, and the spring 706 may be inserted into the overpressure valve assembly 110 and then held down by a threaded set screw 708 which may comprise a hole 710 for the pin 704. The overpressure valve assembly 110 may further comprise slots 712 that may fit a flat head screwdriver (e.g., or some other formed face that can receive a complementary tool to manipulate the assembly 110). The pin 704 may act as a stop and may ensure that the set screw 708 is not threaded in too far into the overpressure valve assembly 110. The spring 706 force may be configured such the overpressure valve 110 will release pressure from within the refillable tank 102 when pressure reaches a maximum level. An epoxy 714 may be used to fill the slots 712 to ensure that the set screw 708 is not removed during use. This may ensure that the pin 704 is not tampered with. This may provide a safer pressure valve solution compared to certain tanks on the market in which the relief valve can be manually opened.

Figure 19:
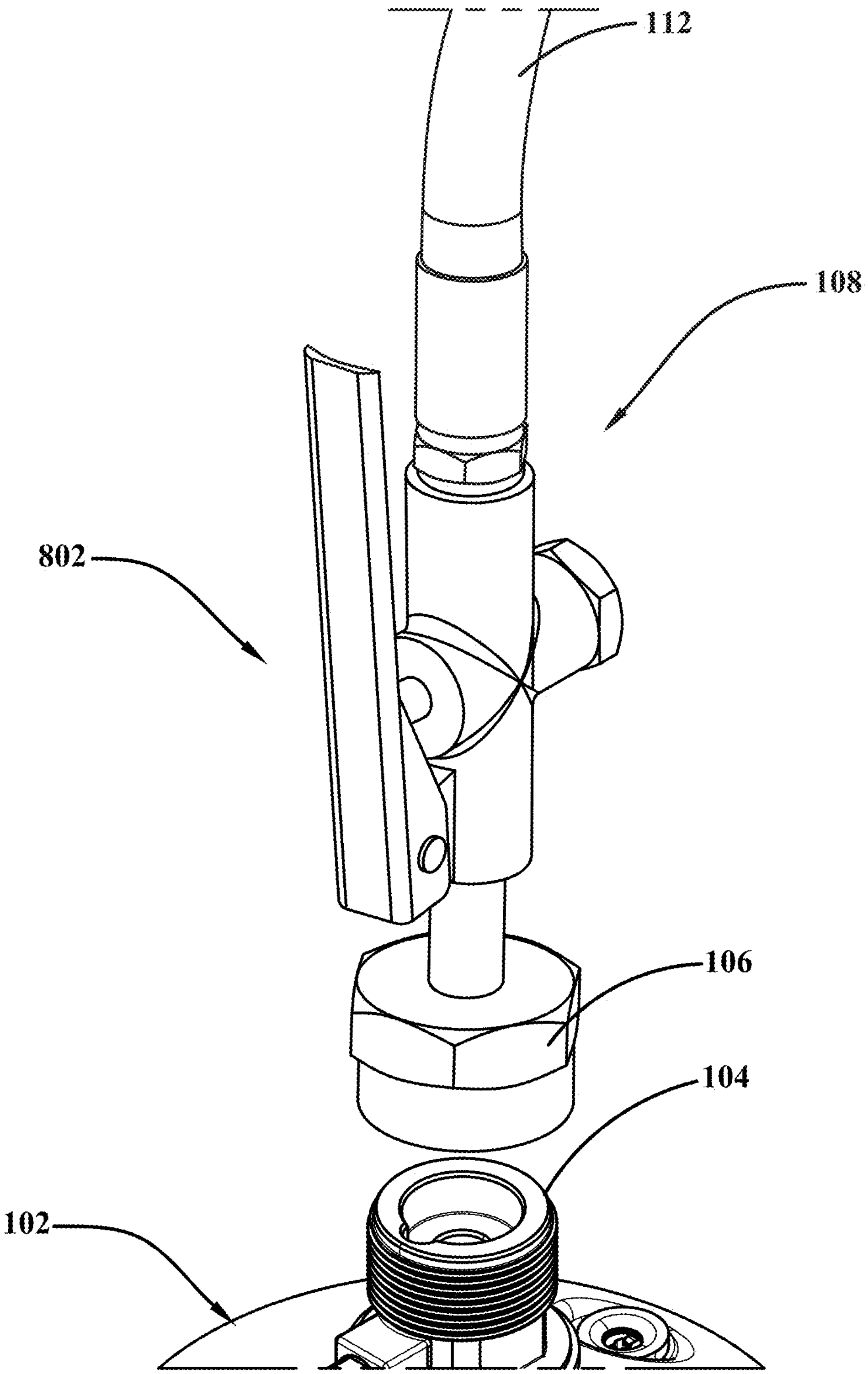
FIG. 19 is an exemplary implementation of the connector with a manual valve in alignment with the valve assembly.

FIG. 19 illustrates and exemplary implementation of a manual fill valve 108. As illustrated, the manual fill valve 108 may be installed between the fill line 112 and the connector 106. The manual fill valve 108 may comprise a handle 802 to control the operation and position of the valve 108. By way of example, when the handle 802 is compressed, the manual fill valve 108 may be opened to create a fluid passage through the fill valve 108, such that a flow of propane may flow through the manual valve 108. The manual valve 108 may be biased into a normally closed position, such that when the handle 802 is released, the valve 108 returns to a closed position. It should be appreciated that the system 100 may include the manual valve 108 for convenience, however, the system may operate without the manual valve 108.

Figure 20A:
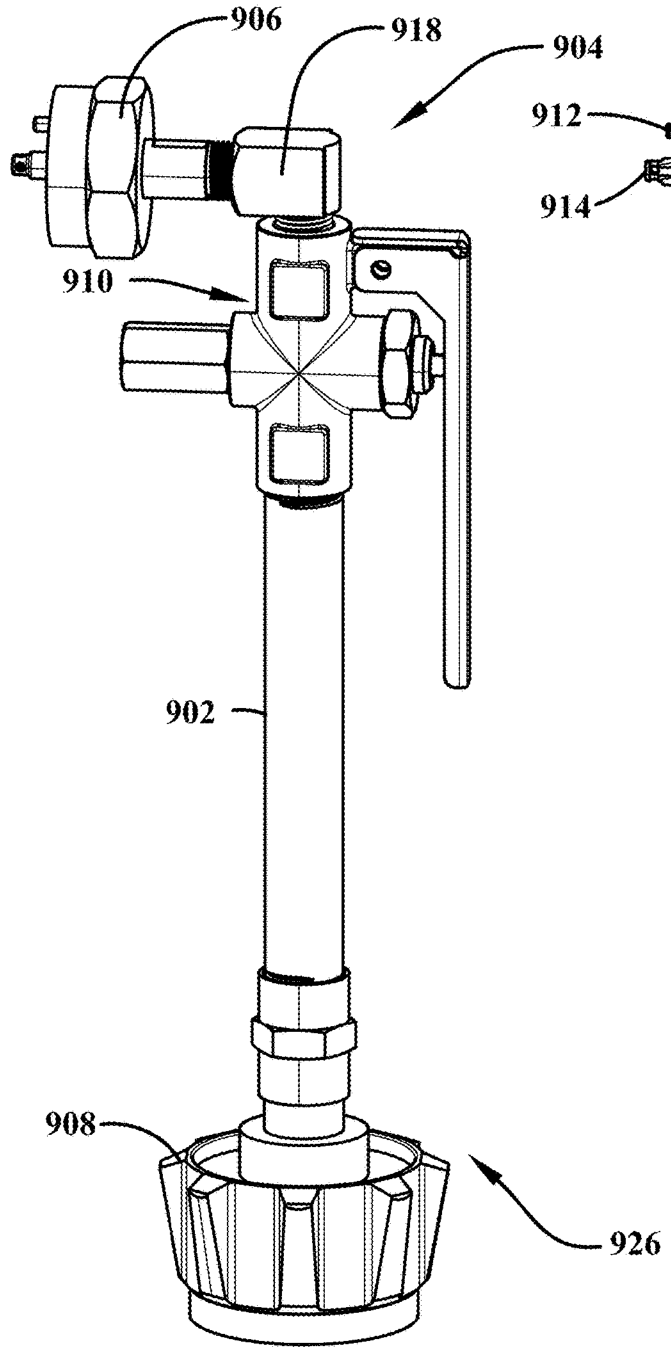
FIGS. 20A and 20B are alternate exemplary implementations of the connector with an alternate manual valve to couple with the valve assembly.
Figure 20B:
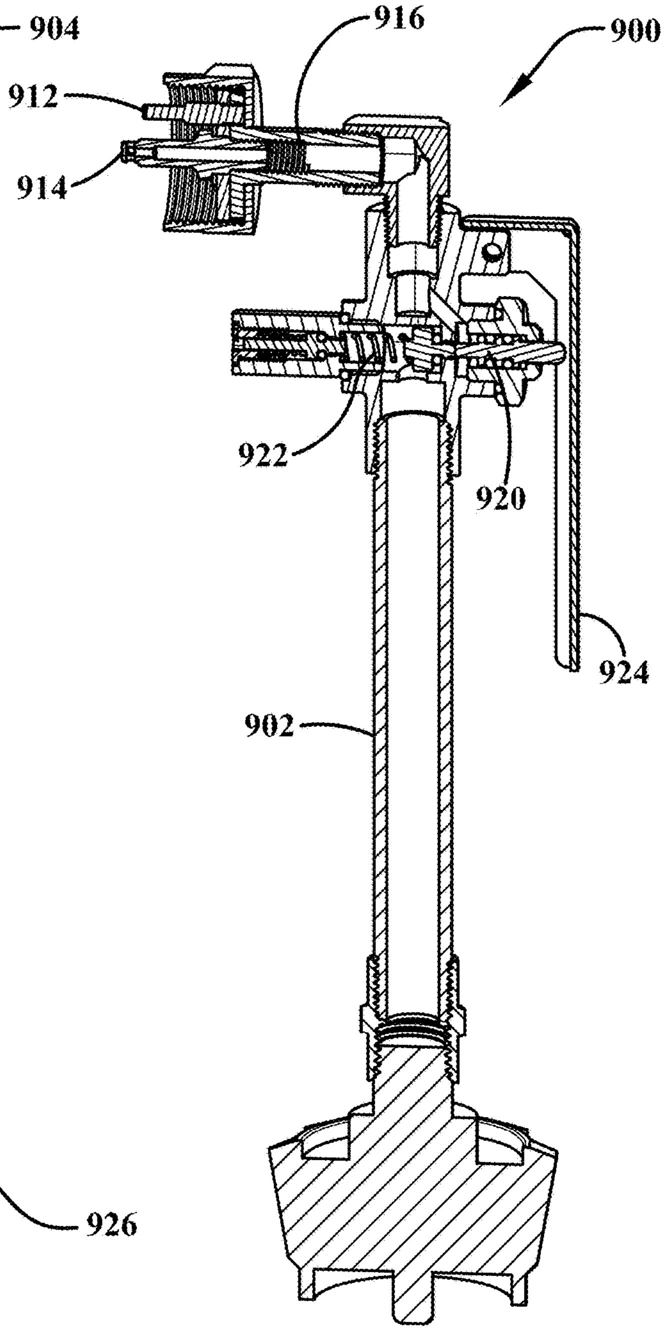

FIGS. 20A and B illustrate another exemplary implementation of a connection assembly 900. In this implementation, the connection assembly 900 a length of tube/tubing 902 (e.g., rigid or flexible) that runs between a first end 904 (e.g., a distal end) and a second end 926 (e.g., a proximal end). A first connector 906 is affixed at the first end 904 and a second connector 908 is affixed at the second end 926. A manually operated valve assembly 910 is affixed to the tubing 902 between the first connector 906 and the second connector 908. The first connector 906 operably, fluidly connects to the valve assembly (e.g., 104, 722, 822) of the refillable tank (e.g., 102, 700, 800). The first connector 906 comprises a first prong 912 and a second prong 914. The first prong 912 is sized and shaped to engage with and actuate the overfill valve (e.g., 326, 736, 836), and the second prong 914 is sized and shaped to engage with and actuate the fill valve (e.g., 402), when the first connector 906 is operably affixed to the valve assembly (e.g., 104, 722, 822).

In this implementation, the first connector 906 is disposed at substantially a ninety degree angle from the tubing 902. For example, a second piece of tubing 916 can be coupled to an elbow 918 distally from the manually operated valve assembly 910, between the manually activated valve 910 and the second connector 908 and the first connector 906, Further, as illustrated, the manually operated valve assembly 910 is configured to be manually operated to open a fluid path between the second connector 908 and the first connector 906, for example, to provide for refilling the refillable tank (e.g., 102, 700, 800). The manually operated valve assembly 910 comprises a refilling valve 920 that is normally biased in a closed position by a biasing spring. Depressing an actuator handle 924 compresses the refilling valve 920 into an open position to fluidly connect the proximal end of the manually operated valve assembly 910 with the distal end of the manually operated valve assembly 910 to allow fluid to flow from the second connector 908 to the first connector 906, for example. As such, fluid can flow from a source tank such as 150 into a refillable tank, such as 102.

In an exemplary implementation, the valve assembly 104 may comprise at least two components: the fill valve 402 that may be normally closed and an overfill valve 326 (e.g., part of the overfill valve assembly 314) that may also be normally closed. When the connector 106 is attached to the valve housing, the first and second prongs 512 and 514 may activate both the fill valve 402 and the overfill valve 326. The fill valve 402 may be a Schrader Valve (e.g., or similar type valve). When the second prong 514 is inserted through an O-ring seal, the refillable tank 102 is fluidly coupled with the fill valve 402 and the hole in the second prong 514. That is, for example, upon insertion of the second prong 514 into the O-ring seal, fluid may flow through the hole in the second prong 514, through the fill valve 402, and into the refillable tank 102.

As an illustrative example, in some implementations, the overfill valve assembly (e.g., 314, 720, 820) may operate in a two-step process. As an example, this may promote propane filling and operating technique to mitigate leakage outside of the tanks. Further, the two-step process may also provide two different sealing methods, for example, if one of the components of the overfill valve assembly (e.g., 314, 720, 820) malfunctions. In this implementation, when the first prong (e.g., 512, 912) of the connector (e.g., 106, 906) is inserted through the O-ring seal, it can engage and depress the overfill valve (e.g., 326, 736, 836). When the overfill valve is depressed against the overfill valve spring (e.g., 328 738, 838), fluid in the tank (e.g., propane) may flow from the overfill dip-tube (e.g., 324, 732, 832) through the overfill valve. In this implementation, the overfill dip-tube (e.g., 732, 832) comprises a hollow body with a first opening (e.g., 760) disposed outside of the refillable tank (e.g., 150) in fluid communication with the overfill valve (e.g., 736, 836), and a second opening (e.g., 762) disposed inside the refillable tank, wherein a position of the second opening is disposed at a predetermined fluid level height.

The fluid (e.g., propane vapor) may then flow into the overfill cavity (e.g., 604, 728, 828), but is mitigated from release into the environment through the output (e.g., 316, 730, 830) at least until the actuator (e.g., 318, 724, 824) of the overfill valve assembly is actuated (e.g., in the appropriate order). Therefore, for fluid (e.g., propane vapor) to be released through the output, the overfill valve may be opened and the actuator may be actuated. If the overfill valve is not opened or if the actuator is not actuated, the fluid (e.g., propane vapor may be mitigated from being released through the output.

In this implementation, when the overfill valve assembly is in an opened position, the overfill cavity may be opened to the surrounding environment. For example, when fluid from inside the tank is released into the surrounding environment, it may serve as a visual indicator to an operator that the fluid being introduced into the refillable tank (e.g., 102, 700, 800) has reached a desired fill level (e.g., reached the level of the overfill dip-tube (e.g., 324, 732, 832)). As an example, propane vapor may flow out of the output when the tank is filled to the desired level. That is, in this example, when the liquid propane level has reached the dip-tube (e.g., which may be set to a desired depth to reach a certain fill level) a small amount of liquid propane may be released from the output. In this example, propane releasing from the output may serve as the visual indicator to an operator indicating that the tank is full (e.g., fluid is at a predetermined level in the tank). The operator may then know to stop the re-filling process and to close the overfill valve via the actuator.

In an exemplary implementation, a process for operating the system 100 may comprise: attaching the second connector (e.g., 114, 908) and connection assembly (e.g., 112, 900) to the source tank 150; and may attach support feet 116 onto the top ring of the source tank 150; inverting the source tank 150 to rest the source tank 150 on the support feet 116; attaching the second connector to the refillable tank (e.g., 102, 700, 800) via fill valve assembly (e.g., 104, 722, 822); opening a valve on the source tank 150; activating the actuator (e.g., 318, 724, 824) of the overfill valve 314 to open the overfill valve assembly (e.g., 314, 720, 820); activating the manual shut off valve 108 to transfer propane from the source tank 150 to the refillable tank; when fluid is released from the output (e.g., 316, 730, 830) of the overfill valve assembly, releasing the manual shut off valve (e.g., 108, 910); activating the actuator to close the overfill valve assembly; closing the valve of the source tank 150; removing the first connector from the refillable tank; returning the source tank 150 to an upright position; and removing the connection assembly from the source tank 150.

It should be appreciated that although the systems and methods are described herein as pertaining to propane gas, that the systems and methods could be used for other suitable gases such as, but not limited to: natural gas, carbon dioxide, butane, ethane, pentane, and the like.

The word “exemplary” is used herein to mean serving as an example, instance or illustration. Any aspect or design described herein as “exemplary” is not necessarily to be construed as advantageous over other aspects or designs. Rather, use of the word exemplary is intended to present concepts in a concrete fashion. As used in this application, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. Further, at least one of A and B and/or the like generally means A or B or both A and B. In addition, the articles “a” and “an” as used in this application and the appended claims may generally be construed to mean “one or more” unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms “includes,” “having,” “has,” “with,” or variants thereof are used in either the detailed description or the claims, such terms are intended to be inclusive in a manner similar to the term “comprising.”

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A tank refilling system, comprising:
a valve assembly and an overpressure valve operably disposed in a wall of a refillable tank, wherein the valve assembly comprises a fill valve; and
a connection assembly comprising a first length of tubing, a first connector affixed at a first end of the tubing, a second connector affixed at a second end of the tubing, and a manually operated valve, the first connector operably, fluidly connects to the valve assembly of the refillable tank and the second connector operably, fluidly connects to a source tank, and the manually operated valve operably, fluidly connecting the first connector with the second connector;
wherein the valve assembly further comprises an overfill valve assembly comprising an overfill valve and a hand operated actuator that operably opens a fluid path between an inside of the refillable tank and outside the refillable tank to a surrounding environment; and
wherein the first connector comprises a second prong, the second prong sized and shaped to engage with and actuate the fill valve when the first connector is operably affixed to the valve assembly.

2. The tank refilling system of claim 1, further comprising a support foot that operably attaches on to a collar of a source tank to operably dispose the source tank in an inverted position.

3. The tank refilling system of claim 1, comprising a first prong that is sized and shaped to engage with and actuate the overfill valve when the first connector is operably affixed to the valve assembly.

4. The tank refilling system of claim 3, wherein the overfill valve assembly comprises an outlet that, when the hand operated actuator is actuated, provides the fluid path from the inside of the refillable tank to the surrounding environment.

5. The tank refilling system of claim 1, wherein the overfill valve assembly comprises a cam assembly operated by the actuator, the cam assembly displacing a pin or post to open the path that fluidly couples the outlet to the inside of the refillable tank.

6. The tank refilling system of claim 5, wherein the overfill valve assembly comprises the pin that operably actuates between an opened and a closed position, wherein the pin is biased in the closed position by a spring, and wherein the actuator is a push button that activates the cam assembly to selectably translate the pin between the opened and the closed position when the push button is pressed.

7. The tank refilling system of claim 1, wherein the overfill valve assembly comprises a threaded post that is rotated in a first direction by the actuator to dispose the overfill valve assembly in an open position, and in a second direction to dispose the overfill valve assembly in a closed position.

8. The tank refilling system of claim 5, wherein the overfill valve assembly comprises the post biased by a spring in a closed position, and wherein the actuator comprises a handle that activates the cam assembly and is fixedly engaged with the post, and wherein the cam assembly comprises a ramp that operably allows the actuator to rotate in a first direction along the ramp to translate the post against the bias to an open position.

9. The tank refilling system of claim 8, wherein the cam comprises one of:
a shoulder at a top of the ramp allowing the actuator to rotate in the first direction at least until the cam rotates past the shoulder, thereby disposing the post back to the closed position; and
a stop at the top of the ramp mitigating rotation of the actuator in the first direction, and allowing rotation of the actuator is a second direction to dispose the post back to the closed position.

10. The tank refiling system of claim 1, the connection assembly comprising an elbow disposed distally from the manually operated valve assembly thereby disposing the first connector substantially ninety degrees from the second connector.

11. The tank refiling system of claim 1, wherein the overfill valve assembly comprises an overfill dip-tube comprising a hollow body with a first opening disposed outside of the refillable tank in fluid communication with the overfill valve, and a second opening disposed inside the refillable tank, wherein a position of the second opening is disposed at a predetermined fluid level height.

12. The tank refiling system of claim 1, wherein the second prong comprises a hollow body that, when the first connector is operably affixed to the valve assembly, fluidly couples the refillable tank with the tubing.

13. A method of using a tank refilling system, wherein the system comprises a valve assembly and an overpressure valve operably disposed in a wall of a refillable tank, wherein the valve assembly comprises a fill valve, and a connection assembly comprising a first length of tubing, a first connector affixed at a first end of the tubing, a second connector affixed at a second end of the tubing, and a manually operated valve, the first connector operably, fluidly connects to the valve assembly of the refillable tank and the second connector operably, fluidly connects to a source tank, and the manually operated valve operably, fluidly connecting the first connector with the second connector, wherein the valve assembly further comprises an overfill valve assembly comprising an overfill valve and a hand operated actuator that operably opens a fluid path between an inside of the refillable tank and outside the refillable tank to a surrounding environment, and wherein the first connector comprises a second prong, the second prong sized and shaped to engage with and actuate the fill valve when the first connector is operably affixed to the valve assembly, the method comprising:
operably connecting the second connector to the source tank;
operably connecting the first connector to the refillable tank;
opening the fluid path using the hand operated actuator;
operably activating the manually operated valve, resulting in fluid flowing from the source tank to the refillable tank; and
closing the fluid path using the hand operated actuator when fluid is indicated at an output of the overfill valve assembly.

14. The method of claim 13, wherein the first connector further comprises a first prong that is sized and shaped to engage with and actuate the overfill valve when the first connector is operably affixed to the valve assembly, and the method further comprising actuating the overfill valve when operably connecting the first connector to the refillable tank.

15. The method of claim 13, further comprising deactivating the manually operated valve to mitigate flow from the source tank to the refillable tank.

16. The method of claim 13, further comprising operably attaching a support foot to a collar on the support tank, and inverting the source tank such that it operably rests on the support foot.

17. The method of claim 13, wherein opening the fluid path using the hand operated actuator comprises one of: rotating an actuator handle, or pressing an actuator button.

18. The method of claim 13, wherein opening the fluid path comprises rotating an actuator handle merely in one direction at least until the overfill valve is disposed in an open position, and the further comprising closing the overfill valve by continuing to rotate the actuator handle in the one direction at least until the overfill valve is disposed in a closed position.

19. A tank refilling system, comprising:

a valve assembly and an overpressure valve operably disposed in a wall of a refillable tank, wherein the valve assembly further comprises a fill valve and an overfill valve assembly, wherein the overfill valve assembly that operably provides a fluid path between an inside of the refillable tank and outside the refillable tank to a surrounding environment, the overfill valve assembly comprising:

an overfill valve normally biased in a closed position;

an outlet;

a manually activated actuator that, when actuated, opens the fluid path that fluidly couples the outlet to the inside of the refillable tank, wherein the actuator comprises a cam assembly fixedly engaged with a post normally biased in a closed position, and wherein the cam assembly comprises a ramp that operably allows the post to translate against the bias to an open position at least until the cam rotates to an end of the ramp;

a connection assembly comprising a first length of tubing, a first connector affixed at a first end of the tubing, a second connector affixed at a second end of the tubing, and a manually operated valve, the first connector operably, fluidly connects to the valve assembly of the refillable tank and the second connector operably, fluidly connects to a source tank, and the manually operated valve operably, fluidly connecting the first connector with the second connector, and the first connector disposed at a ninety degree angle to the second connector, wherein the first connector comprises a first prong and a second prong, the first prong sized and shaped to engage with and actuate the overfill valve to move the overfill valve to an open position, and the second prong sized and shaped to engage with and actuate the fill valve to move the fill valve to an open position, when the first connector is operably affixed to the valve assembly.

20. The tank refiling system of claim 19, wherein the overfill valve assembly comprises an overfill dip-tube comprising a hollow body with a first opening disposed outside of the refillable tank in fluid communication with the overfill valve, and a second opening disposed inside the refillable tank, wherein a position of the second opening is disposed at a predetermined fluid level height.

* * * * *